US011314530B2

(12) United States Patent
Koya et al.

(10) Patent No.: US 11,314,530 B2
(45) Date of Patent: Apr. 26, 2022

(54) USER-BASED EXTENSION SETTING DEVICES, METHODS, AND PROGRAMS

(71) Applicant: Nippon Telegraph and Telephone Corporation, Tokyo (JP)

(72) Inventors: Hidetaka Koya, Tokyo (JP); Hajime Nakajima, Tokyo (JP); Takeshi Masuda, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/055,418

(22) PCT Filed: May 21, 2019

(86) PCT No.: PCT/JP2019/020159
§ 371 (c)(1),
(2) Date: Nov. 13, 2020

(87) PCT Pub. No.: WO2019/225621
PCT Pub. Date: Nov. 28, 2019

(65) Prior Publication Data
US 2021/0149692 A1    May 20, 2021

(30) Foreign Application Priority Data
May 24, 2018   (JP) .............................. JP2018-099884

(51) Int. Cl.
*G06F 9/451* (2018.01)
*G06F 8/38* (2018.01)
*G06F 3/0482* (2013.01)

(52) U.S. Cl.
CPC ................ *G06F 9/451* (2018.02); *G06F 8/38* (2013.01); *G06F 3/0482* (2013.01)

(58) Field of Classification Search
CPC ........... G06F 3/0482; G06F 8/38; G06F 9/451
See application file for complete search history.

(56) References Cited

U.S. PATENT DOCUMENTS

| 5,911,143 A * | 6/1999 | Deinhart ............. G06F 21/6218 |
| 6,574,736 B1 * | 6/2003 | Andrews ................. G06F 9/468 |
| | | 707/999.1 |

(Continued)

FOREIGN PATENT DOCUMENTS

| JP | H 09251305 | 9/1997 |
| JP | 2003-216374 | 7/2003 |
| JP | 2006-163771 | 6/2006 |

OTHER PUBLICATIONS

Zhu et al., "Supporting Software Development with Roles," IEEE Transactions on Systems, Man, and Cybernetics, Part A: Systems and Humans, vol. 36, No. 6, Nov. 2006, pp. 1110-1121. (Year: 2006).*

(Continued)

*Primary Examiner* — Eric J. Bycer
(74) *Attorney, Agent, or Firm* — Fish & Richardson P.C.

(57) ABSTRACT

A setting unit (100) includes: a limitation unit (10) that limits a list of extension user interface items to be added to an existing Web system, the items being selectable by a setting person, according to a role of the setting person including affiliated post, skill, or authority of the setting person and user interface information; and an operation setting unit (14) that sets the extension user interface in which a parameter specifiable for the item selected by the setting person is limited according to the role of the setting person and the user interface information.

8 Claims, 36 Drawing Sheets

(56) References Cited

U.S. PATENT DOCUMENTS

| | | | | |
|---|---|---|---|---|
| 8,024,794 | B1* | 9/2011 | Feldman | G06F 21/6218 726/21 |
| 9,679,264 | B2* | 6/2017 | B'Far | G06F 16/282 |
| 2002/0161734 | A1* | 10/2002 | Stauber | G06F 9/465 |
| 2002/0174333 | A1* | 11/2002 | Harrah | G06F 21/62 713/166 |
| 2004/0093526 | A1* | 5/2004 | Hirsch | G06F 21/6218 726/21 |
| 2005/0149206 | A1* | 7/2005 | Krane | G06F 9/451 700/17 |
| 2006/0095276 | A1* | 5/2006 | Axelrod | G06Q 99/00 717/104 |
| 2006/0228654 | A1* | 10/2006 | Sanjar | G06F 8/34 430/438 |
| 2008/0263462 | A1* | 10/2008 | Mayer-Ullmann | G06F 9/451 715/762 |
| 2008/0263509 | A1* | 10/2008 | Brutman | G06F 8/20 717/104 |
| 2009/0076865 | A1* | 3/2009 | Rousselle | G06Q 10/0633 705/7.36 |
| 2009/0089291 | A1* | 4/2009 | Daily | G06Q 10/10 |
| 2009/0313677 | A1* | 12/2009 | Vidya | G06F 21/604 726/2 |
| 2011/0258233 | A1* | 10/2011 | Unger | G06F 16/24539 707/783 |
| 2011/0265188 | A1* | 10/2011 | Ramaswamy | G06F 21/00 726/28 |
| 2012/0079451 | A1* | 3/2012 | Halbedel | G06F 8/38 717/105 |
| 2012/0324377 | A1* | 12/2012 | Allington | G06F 8/38 715/763 |
| 2013/0212703 | A1* | 8/2013 | Ramesh | G06Q 10/06393 726/28 |
| 2014/0180751 | A1* | 6/2014 | Morinville | G06Q 10/0631 705/7.26 |
| 2015/0105878 | A1* | 4/2015 | Jones | G06F 9/44505 700/83 |
| 2017/0371957 | A1* | 12/2017 | Merhav | G06Q 50/01 |
| 2018/0210869 | A1* | 7/2018 | Viol | G06F 16/90335 |
| 2019/0065157 | A1* | 2/2019 | Varadarajan | G06F 8/34 |

OTHER PUBLICATIONS

Akiki et al., "Engineering Adaptive Model-Driven User Interfaces," IEEE Transactions on Software Engineering, vol. 42, No. 12, Dec. 2016, pp. 1118-1146 (Year: 2016).*

[No Author Listed], "My Neighbor said, "HTML5" Do you Really Understand?" Nikkei Software, 2015, 18(5):77-79, 12 pages (with English Translation).

Diaz et al., "A Language for End-User Web Augmentation: Caring for Producers and Consumers Alike," ACM Transactions on the Web, 2013, 7(2):9, 51 pages.

Diaz et al., "End-User Browser-Side Modification of Web Pages," Web Information Systems Engineering (WISE), 2014, 8786:293-307.

Greasespot.net, [online], "Greasemonkey 4.3 Release," Mar. 16, 2018, retrieved on Apr. 3, 2018, retrieved from URL<https://www.greasepot.net/>, 6 pages.

Harada, "Engineering Research for Optimizing Existing Systems by Placing Parts with Various Functional Enclosures," Business Communication, 2017, 54(10): 18-19, 9 pages (with English Translation).

Nishikawa et al., "User interface extension system for web based business system," The Institute of Electronics, Information and Communication Engineers, 2016, 116(124):63-68, 13 pages (with English Translation).

* cited by examiner

| ROLE (SKILL PERSPECTIVE) | SETTABLE CONTENTS (EX.) |
|---|---|
| BEGINNER-LEVEL PERSON | ONLY CONTENTS THAT CAN BE SET BY SPECIFYING PARAMETER |
| MIDDLE-LEVEL ERSON | IN ADDITION TO ABOVE, LOGIC SUCH AS BRANCH AND REPETITION CAN BE SET |
| ADVANCED-LEVEL PERSON | IN ADDITION TO ABOVE, JAVASCRIPT CODE CAN BE DIRECTLY SET |

Fig. 2

| ROLE (AUTHORITY PERSPECTIVE) | SETTABLE CONTENTS (EX.) |
|---|---|
| OPERATOR | ONLY EXTENSION DISPLAYING CHARACTER STRING ON SCREEN |
| OPERATION SUPERVISOR | IN ADDITION TO ABOVE, ONLY LOW-RISK ADDITIONAL FUNCTIONAL EXTENSION CAN BE SET |
| SYSTEM SUPERVISOR | EXISTING SYSTEM SCREEN CANNOT BE CHANGED, BUT ANY OTHER ADDITIONAL FUNCTIONAL EXTENSION CAN BE SET |
| DEVELOPMENT VENDOR | ALL EXTENSIONS INCLUDING CHANGE TO EXISTING SYSTEM SCREEN CAN BE SET |

Fig. 3

| EXTENSION UI_ID | TYPE OF UI |
|---|---|
| A_01 | LABEL |
| A_02 | RECTANGULAR AREA |
| A_03 | BUTTON |

Fig. 11

| TEMPLATE_ID | TYPE OF UI | TEMPLATE NAME | OPERATION SETTING |
|---|---|---|---|
| T_01 | BUTTON | DEFAULT VALUE INPUT BUTTON | .\template\t_01.xml |
| T_02 | RECTANGULAR AREA | CSV IMPORT | .\template\t_02.xml |

Fig. 12

| OPERATION CLASS_ID | OPERATION CLASS NAME |
|---|---|
| B_01 | CONDITION BRANCH |
| B_02 | REPETITION |
| B_03 | EVENT REGISTRATION |
| B_04 | ACQUISITION |
| B_05 | CONFIGURATION |
| B_06 | CLICK |
| B_07 | DELETE |

Fig. 13

| ROLE 1 | | | | |
|---|---|---|---|---|
| SELECTABLE EXTENSION UI | A_01, A_02 | | | |
| SELECTABLE TEMPLATE | | | | |
| SELECTABLE OPERATION CLASS | OPERATION CLASS | SETTABLE CLASS OF UI | SETTABLE TYPE OF UI | |
| | | | | |
| AVAILABILITY OF EVENT SETTING TO UI THAT REGISTER EVENTS | UNAVAILABLE | | | |

Fig. 21

| ROLE 2 | | | | |
|---|---|---|---|---|
| SELECTABLE EXTENSION UI | A_01, A_02, A_03 | | | |
| SELECTABLE TEMPLATE | T_01 | | | |
| SELECTABLE OPERATION CLASS | OPERATION CLASS | SETTABLE CLASS OF UI | SETTABLE TYPE OF UI | |
| | B_03 | EXTENSION UI | BUTTON | |
| | B_05 | BASIC UI<br>EXTENSION UI | TEXT BOX | |
| AVAILABILITY OF EVENT SETTING TO UI THAT REGISTER EVENTS | UNAVAILABLE | | | |

Fig. 25

| ROLE 3 | | | | |
|---|---|---|---|---|
| SELECTABLE EXTENSION UI | A_01, A_02, A_03 | | | |
| SELECTABLE TEMPLATE | T_01 | | | |
| SELECTABLE OPERATION CLASS | OPERATION CLASS | SETTABLE CLASS OF UI | SETTABLE TYPE OF UI | |
| | B_01 | - | - | |
| | B_02 | - | - | |
| | B_03 | BASIC UI<br>EXTENSION UI | TEXT BOX | |
| | B_04 | BASIC UI<br>EXTENSION UI | ALL TYPES | |
| | B_05 | BASIC UI<br>EXTENSION UI | TEXT BOX | |
| | B_06 | BASIC UI<br>EXTENSION UI | TYPES OTHER THAN BUTTON | |
| AVAILABILITY OF EVENT SETTING TO UI WITH REGISTERED EVENT | UNAVAILABLE | | | |

Fig. 28

| ROLE 4 | | | | |
|---|---|---|---|---|
| SELECTABLE EXTENSION UI | A_01, A_02, A_03 | | | |
| SELECTABLE TEMPLATE | T_01, T_02 | | | |
| SELECTABLE OPERATION CLASS | OPERATION CLASS | SETTABLE CLASS OF UI | SETTABLE TYPE OF UI | |
| | B_01 | — | — | |
| | B_02 | — | — | |
| | B_03 | BASIC UI EXTENSION UI | ALL TYPES | |
| | B_04 | BASIC UI EXTENSION UI | ALL TYPES | |
| | B_05 | BASIC UI EXTENSION UI | ALL TYPES | |
| | B_06 | BASIC UI EXTENSION UI | ALL TYPES | |
| | B_07 | EXTENSION UI | ALL TYPES | |
| AVAILABILITY OF EVENT SETTING TO UI WITH REGISTERED EVENT | AVAILABLE | | | |

Fig. 32

USER-BASED EXTENSION SETTING DEVICES, METHODS, AND PROGRAMS

CROSS-REFERENCE TO RELATED APPLICATIONS

This application is a National Stage application under 35 U.S.C. § 371 of International Application No. PCT/JP2019/020159, having an International Filing Date of May 21, 2019, which claims priority to Japanese Application Serial No. 2018-099884, filed on May 24, 2018. The disclosure of the prior application is considered part of the disclosure of this application, and is incorporated in its entirety into this application.

TECHNICAL FIELD

The present invention relates to a setting apparatus, a setting method, and a setting program.

BACKGROUND ART

A user interface (UI) extension technique that easily achieves functional extension without performing system modification, system revision, or the like has been known as a method for improving the convenience and reducing operational errors in the Web system (see Non Patent Document 1).

This UI extension technique allows for various functional extensions by adding a UI (extension UI) for functional extension in addition to a UI pre-existing on the system screen (basic UI) and setting the operation between the basic UI and the extension UI.

FIG. 37 is a diagram illustrating a related example in which UI extension is applied. A select box (extension UI) (see (2) in FIG. 37) is added over a text box (basic UI) (see (1) in FIG. 37) displayed on a Web screen of a system, and the operation of reflecting a selected value in the text box when the selection of the select box changes is set (see (3) in FIG. 37). Accordingly, an item to be input otherwise requiring a keyboard input can be input in a selective manner, simplifying input and reducing input errors. In operation setting, the target UI is specified to set operation to the UI, and the operation to be performed by the target UI is set using a combination of operation classes.

As such, the UI extension technique can set various functional extensions, but intended contents to set or to be set vary depending on applications. For example, in a site where drastically reducing operation efforts is required by applying the UI extension technology to a system, setting of an automation function and a cooperation function with other systems may be desireable. On the contrary, in a site where drastically changing operations is not required but improving efficiency is required, setting only a check function of input values may be desireable. Additionally, even in the same site, it may be intended to limit setting contents according to the skill of each setting person.

The technique of locking/unlocking functions set by the setting person has been proposed as an approach for limiting setting contents depending on sites or setting persons (see Patent Literature 1). In addition, according to a setting method for the techniques similar to the UI extension, it is common to describe various setting in JavaScript™ (registered trademark) (see Non-Patent Literature 2). However, because JavaScript™ is a language for developers and can describe settings that might jeopardize security, setting methods without using JavaScript™ for end-users have been proposed in which setting contents are limited (see Non Patent Literatures 3, 4).

CITATION LIST

Patent Literature

Patent Literature 1: JP 2003-216374 A

Non Patent Literature

Non-Patent Literature 1: "User Interface Extension Method of Web-based Operation System", Technical Report of The Institute of Electronics, Information and Communication Engineers, ICM, vol. 116, no. 124, pp. 63-68, July, 2016

Non Patent Literature 2: Greasemonkey Homepage, [online], [Search on May 11, 2018], Internet: http://www.greasespot.net/

Non Patent Document 3: Oscar Diaz, Cristobal Arellano, and Maider Azanza. "A Language for End-User Web Augmentation: Caring for Producers and Consumers Alike", ACM Trans. Web Vol. 7, No. 2, Article 9 (May 2013), 51 pages.

Non-Patent Document 4: O. Diaz, C. Arellano, I. Aldalur, H. Medina, S. Firmenich, "End-User Browset-Side Modification of Web Pages", B. Benatallah, A. Bestavros, Y. Manolopoulos, A. Vakali, Y. Zhang, (Eds.) WISE 2014, Part I. LNCS, vol. 8786, pp. 293-307. Springer, Heidelberg (2014)

SUMMARY OF THE INVENTION

Technical Problem

However, related techniques that only limit setting based on only the role of the setting person (data encompassing the affiliated post, skill, authority, and the like of the setting person) have the challenge that it is difficult to limit UI extension setting as desired.

FIG. 38 is a diagram for describing problems of the related art. For example, in FIG. 38, as in related technology, following limitation is made: based on the role of the setting person, a setting person A can set the function of "clicking" as an automation function, and a setting person B cannot set the function of "clicking" because a person has to click a button due to operational constraints.

However, with such limitation, the setting person B also cannot set the extension that is not operationally constrained and contributes to an improvement of efficiency, for example, the extension of "automatically determining the necessity of presence at construction based on input contents and "clicking"" (see (1), (2) in FIG. 38).

It is also conceivable that the "automatically determining the necessity of presence at construction based on input contents and "clicking"" is managed as one function, and the availability of the function is limited according to the role of the setting person. However, as mentioned above, the UI extension technique is capable of setting various functional extensions, and setting contents largely vary depending on the system of interest and thus, according to the related art, it is difficult to manage the functions in such granularity.

In light of the foregoing, an object of the present invention is to provide a setting apparatus, a setting method, and a setting program that can appropriately limit UI extension setting in a range to be constrained.

Means for Solving the Problem

In order to resolve the problems described above and achieve the object, a setting apparatus according to the present invention is a setting apparatus for user interface extension, and the method includes: at a limitation unit, limiting a list of extension UI items to be added to an existing Web system, the items being selectable by a setting person, according to a role of the setting person including affiliated post, skill, or authority of the setting person and UI information; and at a setting unit, setting an extension UI in which a parameter specifiable for the item selected by the setting person is limited according to the role of the setting person and the UI information.

Effects of the Invention

According to the present invention, the setting of the UI extension can be appropriately limited in a range to be constrained.

BRIEF DESCRIPTION OF DRAWINGS

FIG. 2 is a diagram for describing contents of a role.

FIG. 3 is a diagram for describing contents of the role.

FIG. 11 is a table illustrating an example of data configuration an extension UI list.

FIG. 12 is a table illustrating an example of data configuration of a template list.

FIG. 13 is a diagram illustrating an example of data configuration of an operation class list.

FIG. 21 is a diagram illustrating an example of the role.

FIG. 25 is a diagram illustrating an example of a role.

FIG. 28 is a diagram illustrating an example of the role.

FIG. 32 is a diagram illustrating an example of the role.

DESCRIPTION OF EMBODIMENTS

Hereinafter, an embodiment of the present invention will be described in detail with reference to drawings. Note that the present disclosure is not limited by the embodiment. Also, the same components in description of the drawings will be represented with the same reference signs.

Embodiment

Figure 1:
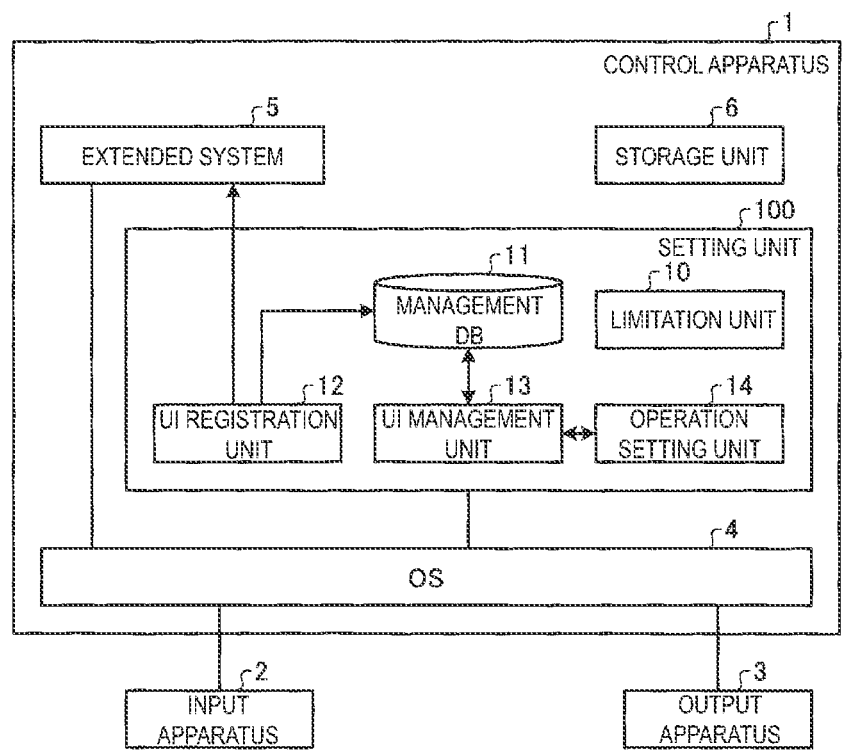
FIG. 1 is a diagram illustrating an example of the configuration of a control apparatus in accordance with an embodiment.

First, the embodiment of the present invention will be described. FIG. 1 is a diagram illustrating an example of the configuration of a control apparatus 1 in accordance with the embodiment. As illustrated in FIG. 1, the control apparatus 1 in accordance with the embodiment is connected to an input apparatus 2 and an output apparatus 3.

The input apparatus 2 is a device that accepts inputs of various instruction information to the control apparatus 1 in response to user's input operations. The input apparatus 2 is realized as an input device such as a keyboard or a mouse.

The output apparatus 3 is realized as a liquid crystal display or the like, and displays thereon screens controlled by the control apparatus 1, for example, a Web screen and a screen for UI extension setting.

The control apparatus 1 is realized by reading a predetermined program into a computer or the like including a read only memory (ROM), a random access memory (RAM), a flash memory, and a central processing unit (CPU), and causing the CPU to execute the predetermined program. The control apparatus 1 includes an operating system (OS) 4 that manages the entire apparatus, an extended system 5 that is a target for UI extension, a storage unit 6, and a setting unit 100 (setting apparatus) that creates UI extension setting of the extended system 5.

The storage unit 6 stores setting person's roles. The role is data that encompasses the affiliated post, skill, and authority of the setting person. For example, the role is data that indicates, for each setting person, a selectable extension UI, a selectable template, a selectable operation class ((command of) class of operation), and availability of event setting to the UI with registered event. Any type of format such as table data, tree structure data, and key value data can be applied as the role, and the role can be hierarchically expressed. Note that as for operation class, a parameter specified by the user is present for each type. The parameter includes a portion that specifies the UI and a remaining portion such as character string. Hereinafter, the operation setting refers to one operation class or a combination of one or more operation classes.

FIGS. 2 and 3 are diagrams for describing contents of the role. For example, in the role, contents that can be set are changed according to the setting person's skill. Specifically, as illustrated in Table P1 in FIG. 2, in the "beginner-level" setting person's role, "only contents that can be set by simply specifying parameter" can be set. In the "middle-level" setting person's role, "operation class of describing logic such as branch or repetition can be set". In the "advanced-level" setting person's role, "JavaScript™ code can be directly set if required."

In addition, in the role, the settable contents are changed according to the setting person's authority. Specifically, as illustrated in Table P3 in FIG. 3, in the role of the setting person "operator", "only extension of displaying character string on screen can be set". In the role of the operator "system supervisor", "existing system screen cannot be changed, but any other additional functional extension can be set". In the role of the setting person "development vendor", "all the extensions including changes to existing system screens can be set".

In this way, a plurality of setting person's roles can be defined. Furthermore, when a plurality of roles are provided, a combination of the plurality of defined roles may be used as one role. Specifically, in the case where the setting person is a "beginner-level" "operator", the "beginner-level person's" role (see FIG. 2) and the "operator's" role (see FIG. 3) may be combined together.

The example in which the role is stored in the storage unit 6 of the control apparatus 1 is described herein, but the present invention is not limited to the case. The role may be provided as locally-stored setting file, may be provided via a network by entering account information at activation of the system, or may be previously incorporated in the setting unit 100. For example, the role may also be provided by the operation of selecting the role by the setting person using a Graphical User Interface (GUI) after activation of the system. Note that the storage unit 6 may be realized as a storage device such as a hard disk, an optical disk, or the like.

The setting unit 100 appropriately changes the limitation range according to the role and the UI information to create UI extension setting. Thus, the setting unit 100 does not need to individually develop a beginner editor or an advanced editor for graded roles.

[Configuration of Setting Unit]

Next, the configuration of the setting unit 100 will be described. The setting unit 100 includes a limitation unit 10, a management DB 11, a UI registration unit 12, a UI management unit 13, and an operation setting unit 14 (setting unit).

The limitation unit 10 limits a list of extension UI items that can be set by the setting person according to the setting person's role and UI information. The extension UI is an UI added to the existing Web system. Examples of the extension UI items include: the type of UI such as label, rectangular area, and button; the template of the extension UI; and the operation class for setting UI operation such as condition branch and repetition. The limitation unit 10 limits lists of the type of UI, the template of the extension UI, and the combination of operation classes.

The management DB 11 stores UI information. The UI information stores the class of UI indicating whether the UI is the basic UI or the extension UI, the type of UI, and the event registered with the UI. The basic UI is the UI that is displayed on the Web screen of the system to which UI extension is applied (extended system 5), and is originally built in the system. The extension UI is the UI added to the basic UI. The type of UI includes button, text box, and the like. The event registered with the UI include click, change, and the like.

The UI registration unit 12 specifies the UI (basic UI) displayed on the Web screen of the extended system 5 to which the UI extension is applied, and registers the specified UI in the management DB 11. The UI registration unit 12 selects the extension UI added to the basic UI, and registers the selected UI in the management DB 11. At this time, instead of selecting the added extension UI, the template that is a pair of the type of extension UI and operation setting may be selected. When the template is selected, the extension UI is similarly registered in the management DB 11, and the combination of the operation classes is reflected in the operation setting unit.

The UI management unit 13 manages the registered UI in the management DB 11. For example, for each registered UI, the UI management unit 13 sets the class of UI indicating whether the UI is the basic UI or the extension UI, the type of UI such as button, text box, and the like, the event (click, change, etc.) registered with the UI, and manages them with alias (another name).

The operation setting unit 14 creates operation setting of UI extension by selecting and combining the operation classes and specifying the parameter. The operation setting unit 14 limits specifiable parameters for the operation class selected by the setting person according to the role of the setting person and the UI information. When the alias of the operation setting target is specified as the parameter of the operation class with reference to the alias list registered by the UI management unit 13, the operation setting unit 14 limits the specifiable alias according to the type of operation class in addition to the role of the setting person and the UI information. In this manner, the operation setting unit 14 sets the extension UI in which setting contents are limited, according to the role and UI information, to the extended system 5. Examples of the parameter include alias, character string, numerical value, color, etc.

The UI extension setting created by the operation setting unit 14 is reflected in the extended system 5. As a result, the extended system 5 displays the Web screen, to which the UI extension limited to be suitable for the environment using the UI extension technique is applied according to the role of the setting person and UI information, on the display device 2.

[Flow up to Operation Setting]

Next, a flow up to the operation setting of the UI extension by the setting unit 100 will be described. FIGS. 4 to 7 are diagrams illustrating the flow of UI extension up to the operation setting by the setting unit 100 illustrated in FIG. 1.

FIGS. 4 to 7 illustrate the operation in the case of setting "upon clicking of default value input button (the extension UI), default value is automatically set in input field (basic UI)" without any limitation. Note that in this example, the UI registration unit 12 and the UI management unit 13 are implemented on a graphical user interface, and a visual programming editor (Blockly™) is applied to the operation setting unit 14, and any screen configuration or implementation, such as a Web application or a mobile terminal application, is possible.

Figure 4:
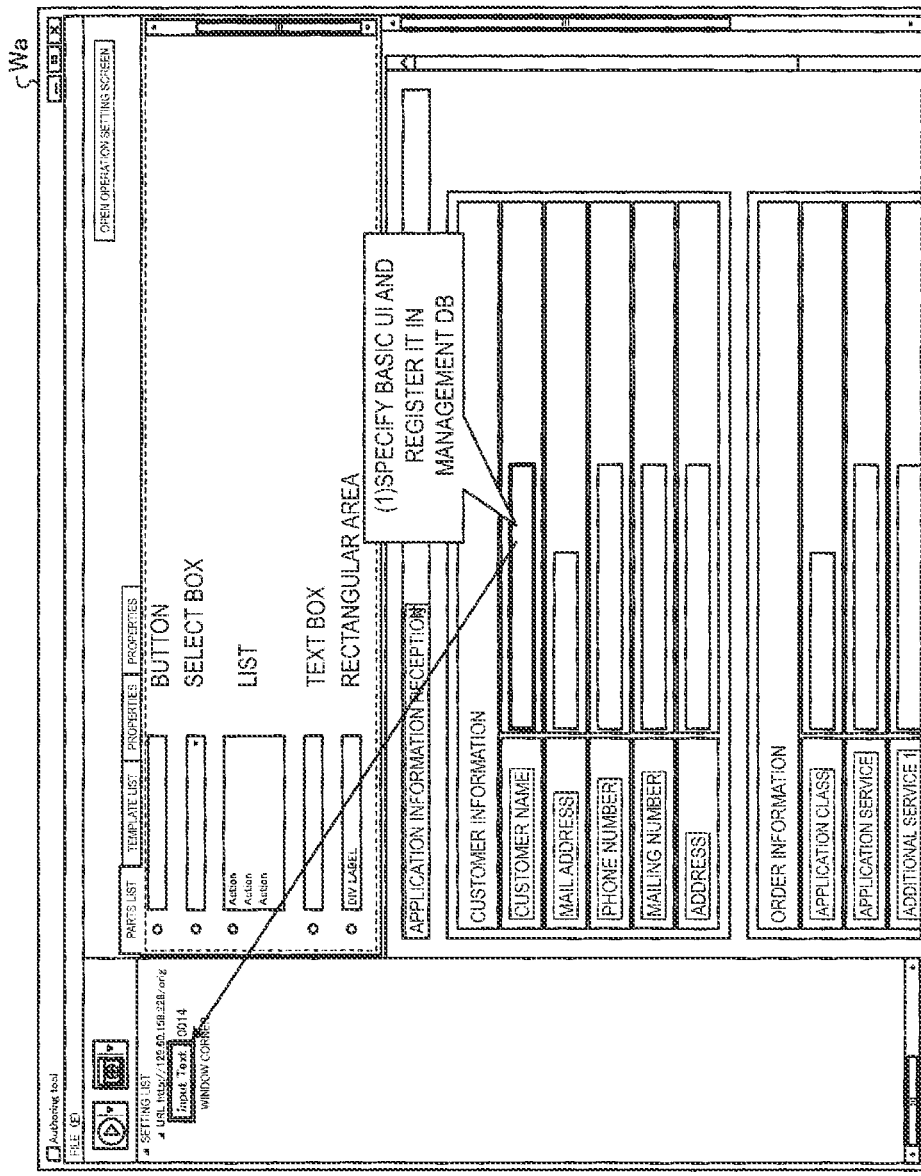
FIG. 4 is a diagram for describing a flow up to UI extension operation setting by a setting unit illustrated in FIG. 1.

First, as illustrated in FIG. 4, the UI registration unit 12 specifies the basic UI, which serves as a base point to impart extension, on a capture of a system screen Wa, and registers the basic UI in the management DB 11 (see (1) in FIG. 4). In this example, the UI registration unit 12 registers an input field (for example, "customer name" field) as the basic UI.

Figure 5:
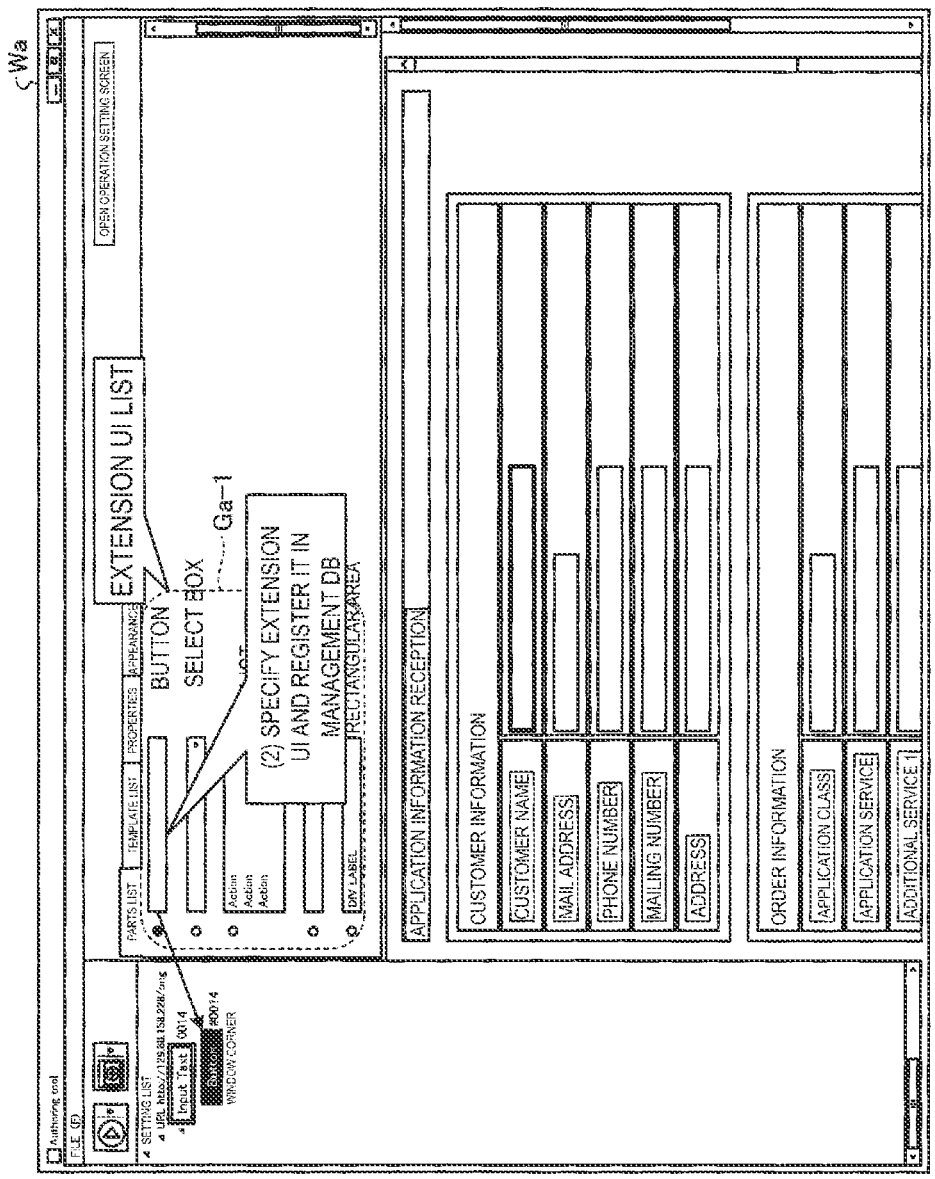
FIG. 5 is a diagram for describing the flow up to the UI extension operation setting by the setting unit illustrated in FIG. 1.

And, as illustrated in the system screen Wa in FIG. 5, the UI registration unit 12 selects the extension UI added to the basic UI from an extension UI list Ga-1, and registers the selected extension UI in the management DB 11 (see (2) in FIG. 5). Here, the UI registration unit 12 registers button as the extension UI.

Figure 6:
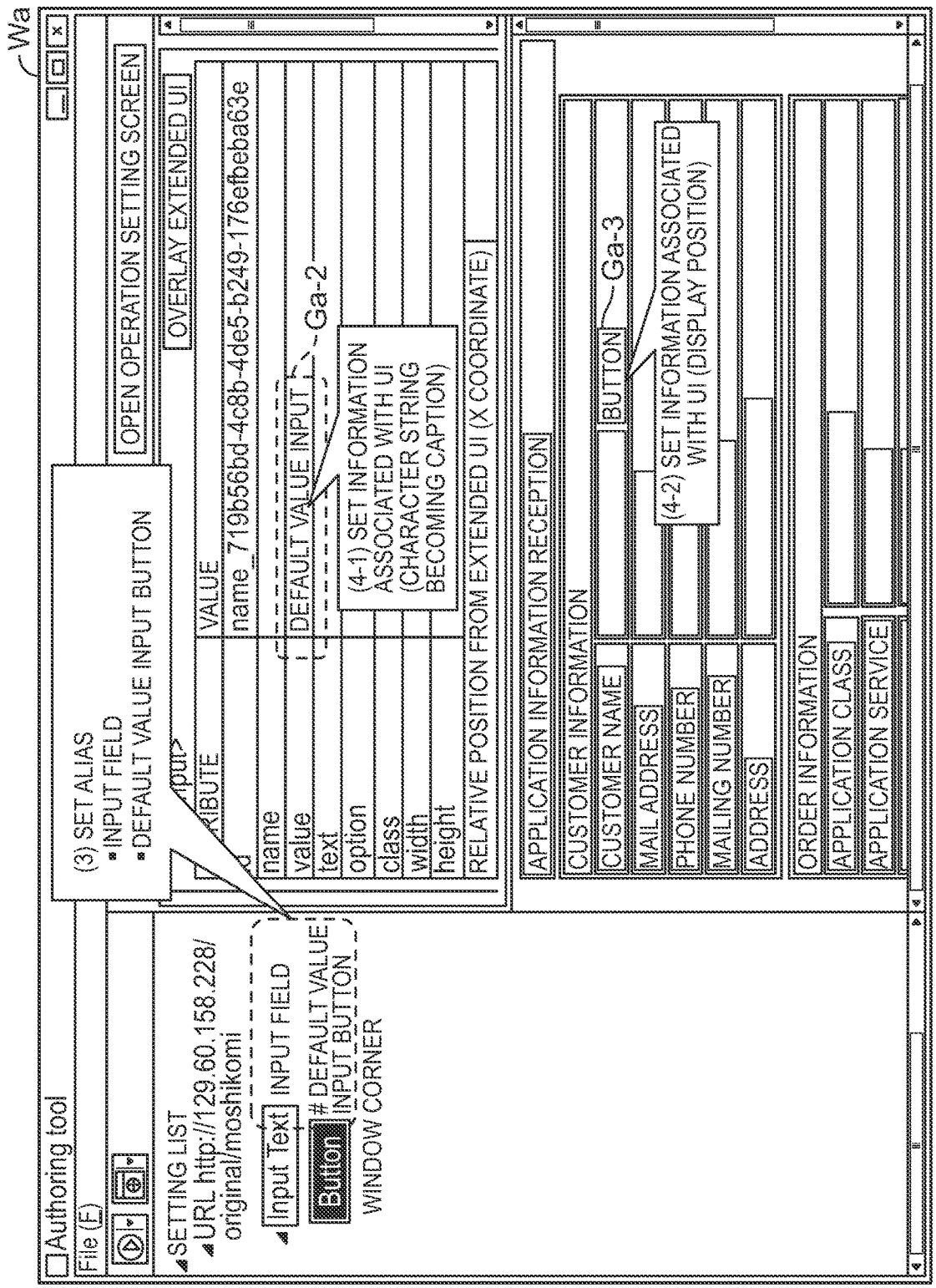
FIG. 6 is a diagram for describing the flow up to the UI extension operation setting by the setting unit illustrated in FIG. 1.

Subsequently, as illustrated in the system screen Wa in FIG. 6, the UI management unit 13 sets the alias for each UI (see (3) in FIG. 6). The alias is used in specifying the target UI in the operation setting unit 14. In addition, the UI management unit 13 can set information associated with the UI (information relating to appearance and display position such as color of the UI, character string of caption, and the like) as necessary (see (4-1), (4-2), a frame Ga-2, a button Ga-3 in FIG. 6).

Figure 7:
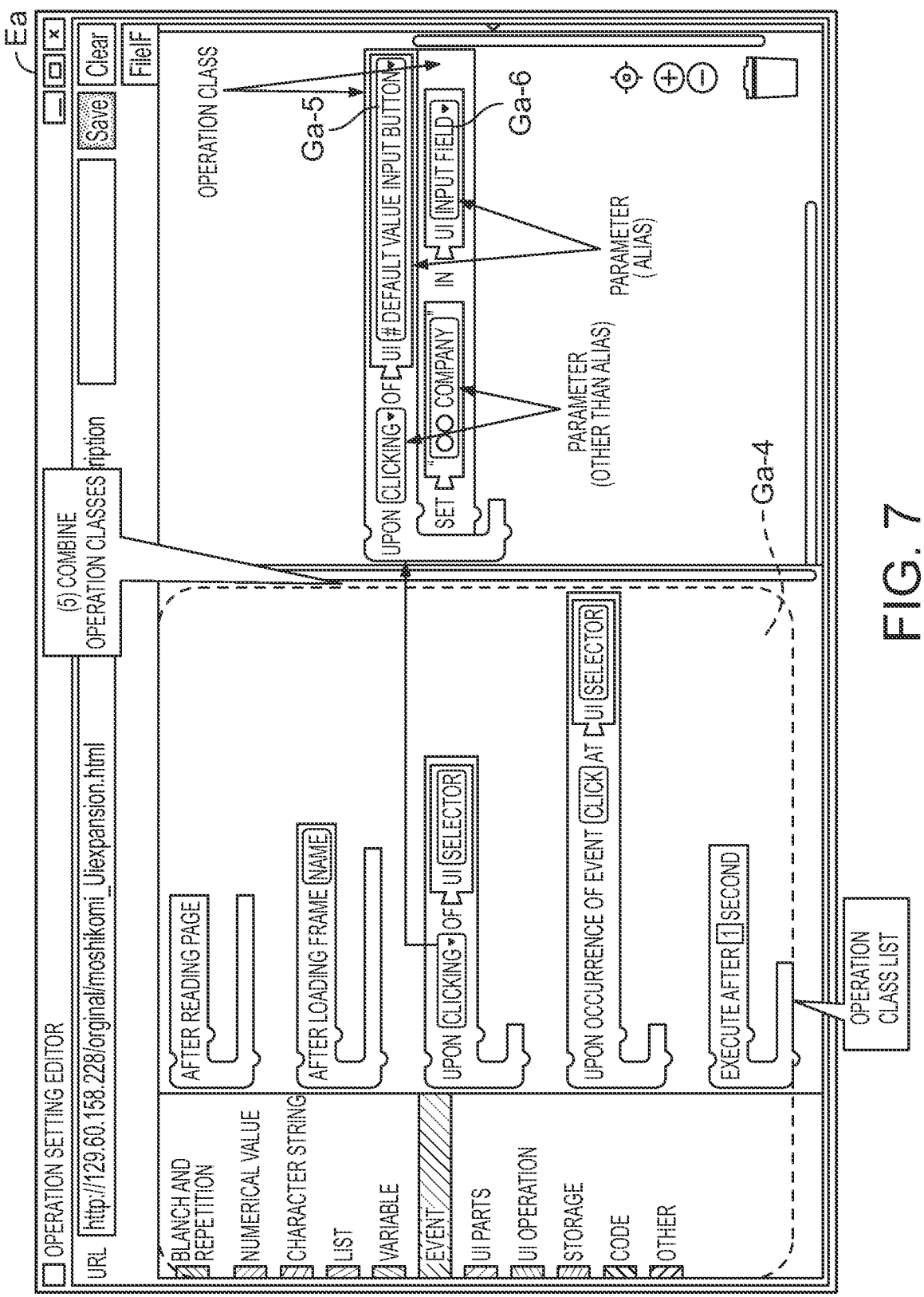
FIG. 7 is a diagram for describing the flow up to the UI extension operation setting by the setting unit illustrated in FIG. 1.

Then, as illustrated in an operation setting editor Ea in FIG. 7, the operation setting unit 14 selects operation classes from an operation class list Ga-4 and combines the operation classes (see (5) in FIG. 7). In the example of FIG. 7, the operation setting unit 14 combines two operation classes "upon clicking" (see Ga-5 in FIG. 7) and "set" (see Ga-6 in FIG. 7).

Then, when specifying the target UI, the operation setting unit 14 acquires an alias list from the UI management unit 13, specifies the target UI from the list, and sets the target UI as a parameter of the operation class. In the example in FIG. 7, the operation setting unit 14 specifies the alias "default value input button" (see Ga-5 in FIG. 7) for the operation class "upon clicking", and specifies the alias "input field" for the operation class "set" (see Ga-6 in FIG. 7).

Figure 8:
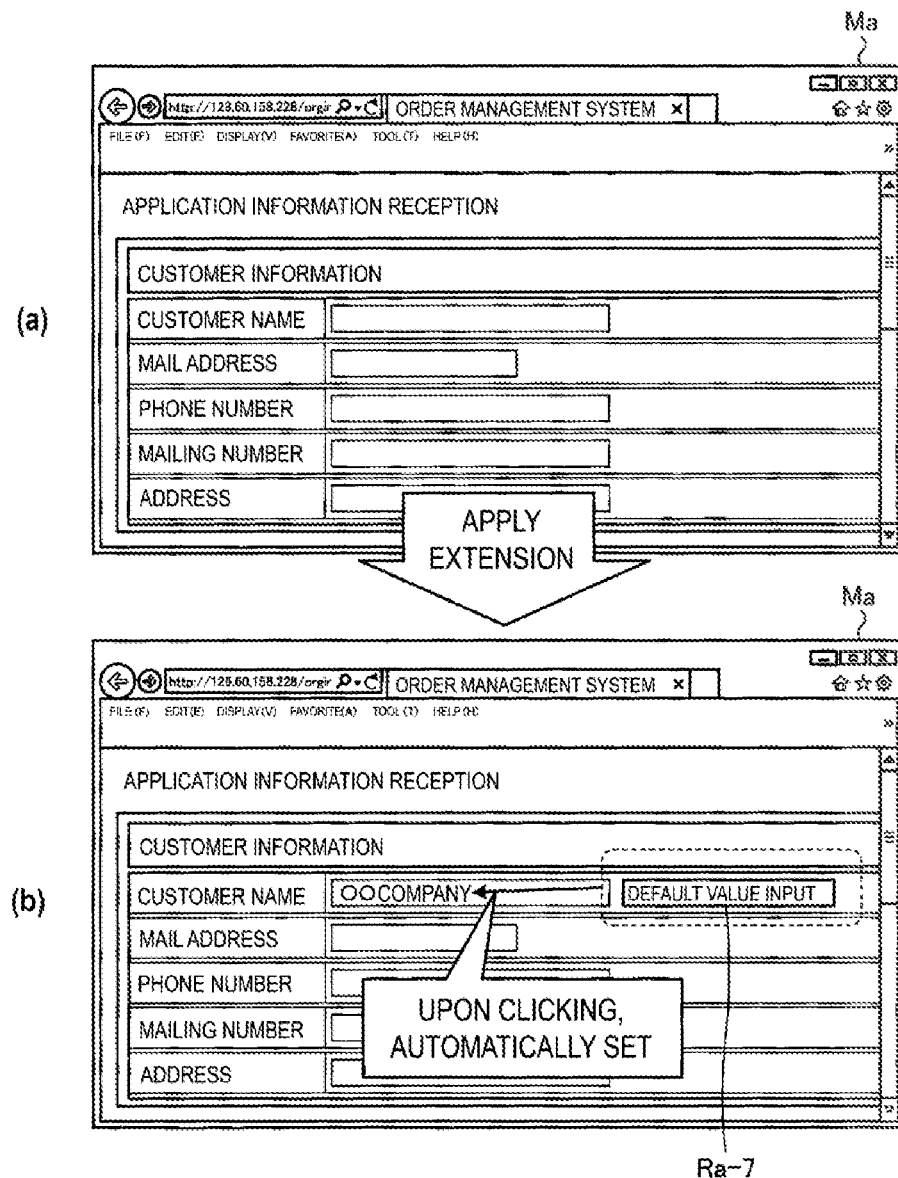
FIG. 8 is a diagram illustrating an example of an extension in which the operating configuration is applied by the setting unit illustrated in FIG. 1.

This completes the operation setting by the setting unit 100. FIG. 8 is a diagram illustrating an example of the extension to which the operation setting by the setting unit 100 in FIG. 1 is applied. By applying the extension, upon clicking of a default value input button Ra-7, a menu screen Ma (see (a) in FIG. 8) is extended to a menu screen Ma' (see (b) in FIG. 8) on which "00 company" is automatically set.

Figure 9:
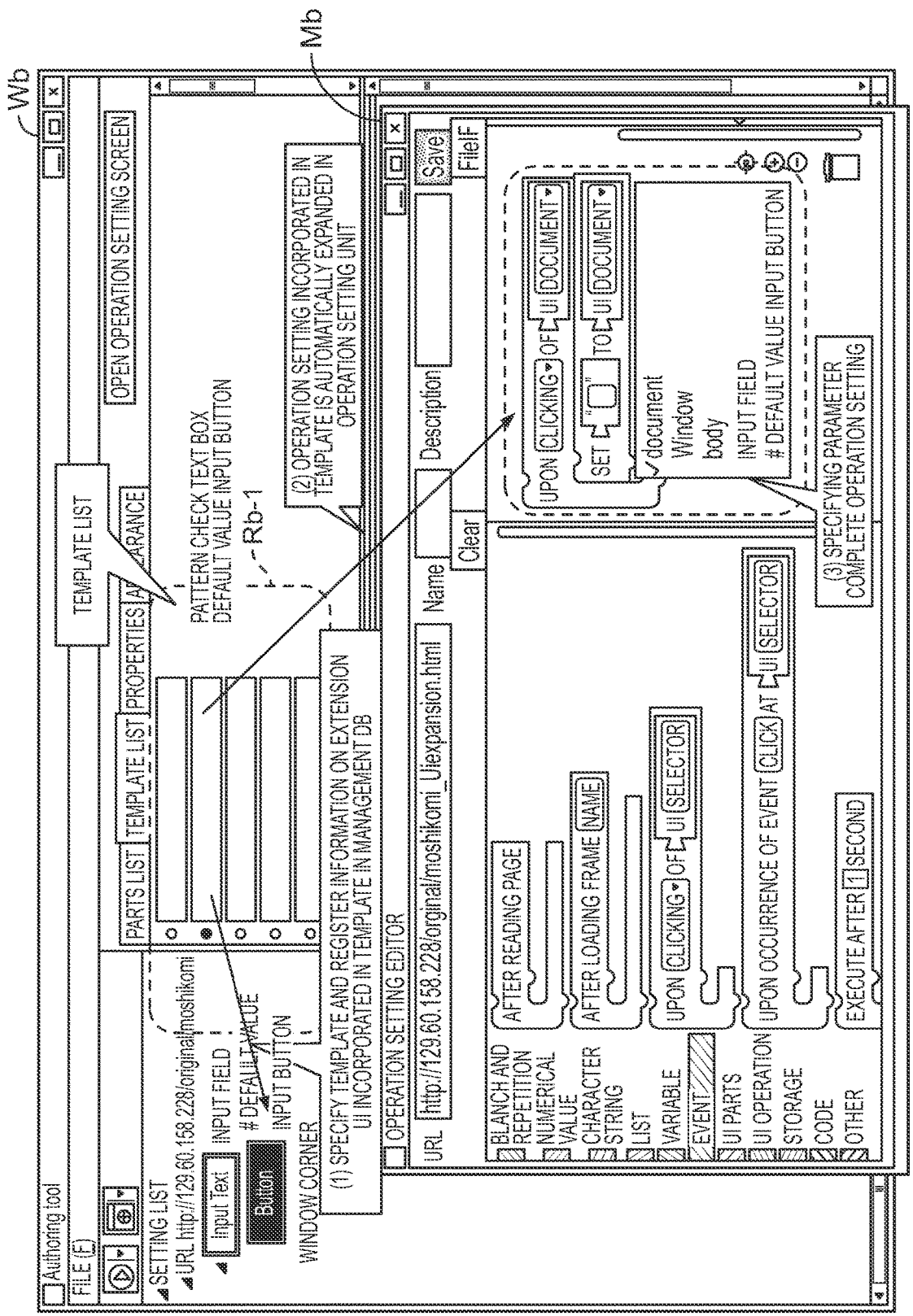
FIG. 9 is a diagram illustrating an example of a system screen.

FIG. 9 is a diagram illustrating an example of the system screen. In order to facilitate the selection of the extension UI and the creation of operation setting, the setting unit 100 can manage and use a template list including the type of the extension UI and the combination of the operation classes.

First, the UI registration unit 12 specifies the template and registers information on the extension UI incorporated into the template in the management DB 11 (see (1) in FIG. 9).

Specifically, as illustrated on a system screen Wb, the template "default value input button" is prepared and the UI management unit 13 selects any template from a template list Rb-1 instead of selecting the extension UI from the extension UI list. Thereby, an operation setting screen Mb incorporated into the template is automatically expanded in the operation setting unit 14 (see (2) in FIG. 9). That is, the screen Mb for the combination of operation classes is automatically created. When the operation setting unit 14 specifies the parameter (such as alias), setting is completed (see (3) in FIG. 9).

[Item List Limitation Processing]

Next, an extension UI setting method in limiting the extension UI depending on the operator by the setting unit 100 will be described. First, a procedure of item list limitation processing of limiting a list of items that can be set by the setting person will be described.

Figure 10:
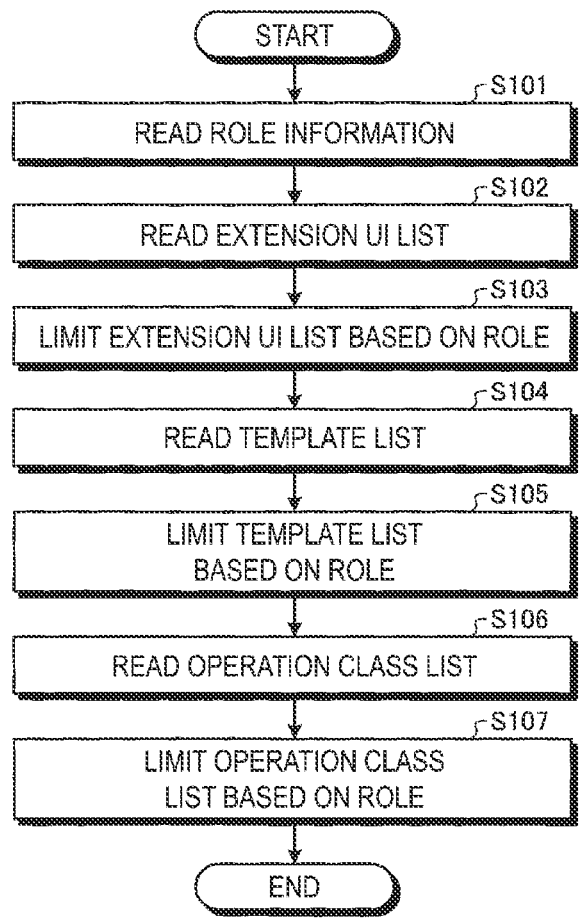
FIG. 10 is a flowchart illustrating a procedure of item list limitation processing.

FIG. 10 is a flowchart illustrating a procedure of the item list limitation processing. The item list limitation processing is executed at a timing, such as in initialization processing before creating setting, at startup of the system, or the like.

As illustrated in FIG. 10, the limitation unit 10 reads the role from the storage unit 6, for example (step S101). The role read in the step S101 is described. Note that, in response to the level or authority of the setting person corresponding to the role, the selectable extension UI, the selectable template, the selectable operation class, and the availability of event setting to the UI with registered event are set to the role. For example, a combination of a plurality of settable classes of UI is set as one operation class.

Subsequently, the limitation unit 10 reads an extension UI list that is a list of types of the extension UI added to the Web system (step S102). FIG. 11 is a table illustrating an example of data configuration of the extension UI list. As illustrated in FIG. 11, extension UI_ID and the type of UI are set as an items in the extension UI list L1. For instance, the extension UI_ID "A_01" is associated with the type of UI "button", the extension UI_ID "A_02" is associated with the type of UI "rectangular area", and the extension UI_ID "A_03" is associated with the type of UI "button".

The limitation unit 10 limits the extension UI list that can be added in the role based on the read role and the extension UI list (step S103).

Then, the limitation unit 10 reads the template list (step S104). FIG. 12 is a table illustrating an example of data configuration of the template list. As illustrated in FIG. 12, template_ID, type of UI, template name, and incorporated operation setting are set as items in the template list L2. For example, the template_ID "T_01" is associated with the type of UI "button", the template name "default value input button", and the operation setting ".\template\t_01.xml". The template_ID "T_02" is associated with the type of UI "rectangular area", the template name "CSV import", and the operation setting ".\template\t_02.xml".

Then, the limitation unit 10 limits the template list that can be added in the role based on the read role and the template list (step S105).

Subsequently, the limitation unit 10 reads the operation class list that sets behavior (operation) of the extension UI (step S106). FIG. 13 is a table illustrating an example of data configuration of the operation class list. As illustrated in FIG. 13, operation class_ID and operation class name are set as items in the operation class list L3. For example, the operation class_ID "B_01" is associated with the operation class name "condition branch", and the operation class_ID "B_02" is associated with the operation class name "repetition".

Then, the limitation unit 10 limits the operation class combination list based on the read role and the operation class list (step S107).

Here, the extension UI list, the template list, and the operation class list may be given as locally-stored setting files. Also, the extension UI list, the template list, and the operation class list may be provided via a network, or may be previously incorporated into the setting unit 100.

[UI Registration Processing]

Figure 14:
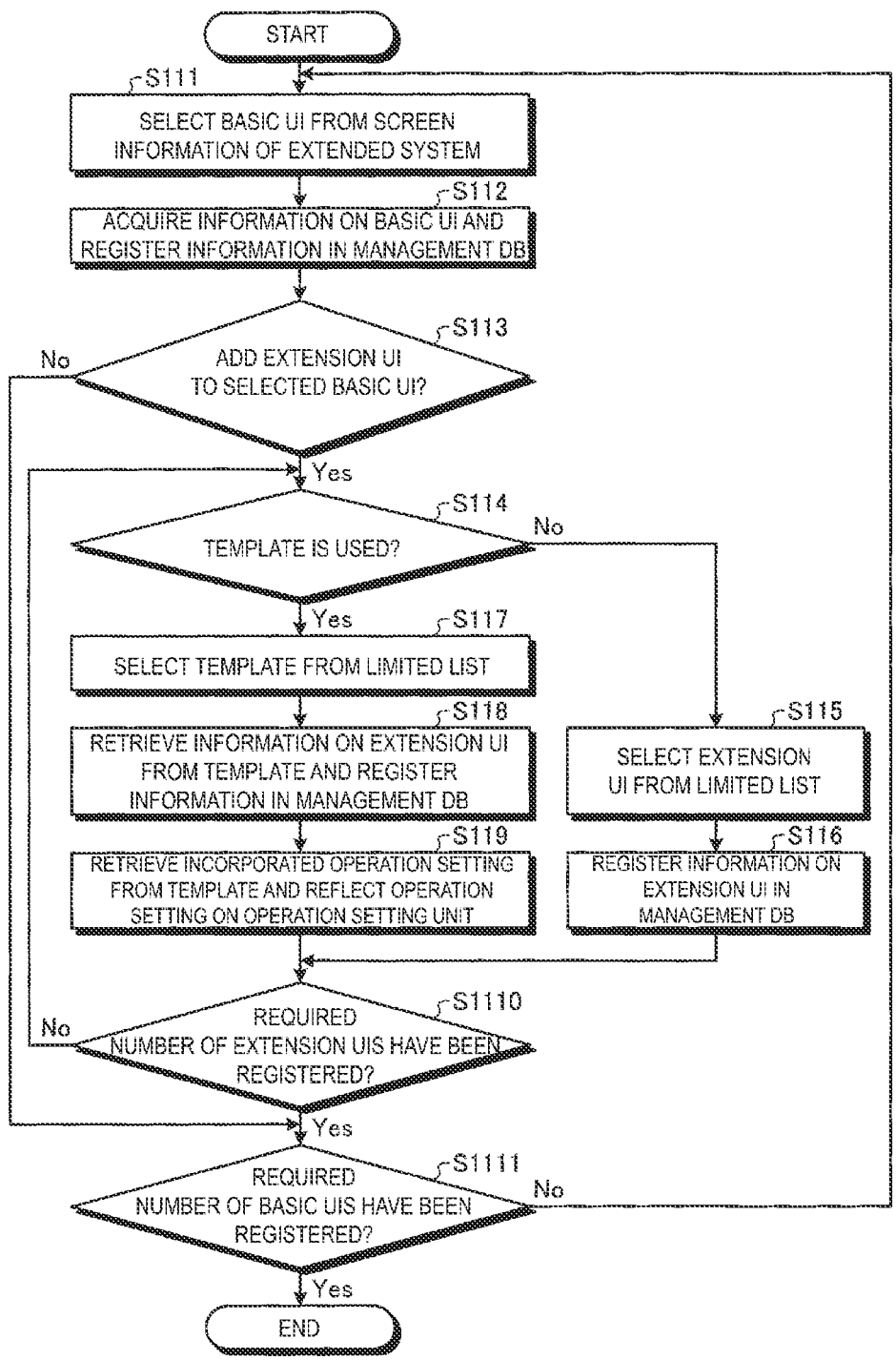
FIG. 14 is a flowchart illustrating an example of a procedure of UI registration processing.

Next, an example of processing of the UI registration unit 12 is described. FIG. 14 is a flowchart illustrating an example of a procedure of the UI registration processing.

As illustrated in FIG. 14, the UI registration unit 12 selects the basic UI from the screen information of the target system to be extended (step S111). At this time, the UI registration unit 12 may also select the basic UI directly on the Web screen of the extended system 5. The UI registration unit 12 may also acquire screen configuration information such as a Web screen capture or a document object Model (DOM), and display the capture screen on the application, to select the basic UI on the capture screen.

Then, the UI registration unit 12 acquires information on the selected basic UI (at least the class of UI, the type of UI, and the event registered with the UI), and registers the information in the management DB 11 (step S112). Subsequently, the UI registration unit 12 determines whether or not the extension UI is added to the selected basic UI (step S113).

When determining that the extension UI is not added to the selected basic UI (step S113: No), the UI registration unit 12 determines whether or not the required number of basic UIs has been registered (step S1111).

When determining that the required number of basic UIs has been registered (step S1111: Yes), the UI registration unit 12 terminates the processing as it is. On the contrary, when determining that the required number of basic UIs has not been registered (step S1111: No), the UI registration unit 12 returns to the step S111.

When determining that the extension UI is added to the selected basic UI (step S113: Yes), the UI registration unit 12 determines whether or not the template is used (step S114). When determining that the template is not used (step S114: No), the UI registration unit 12 selects an extension UI from the limited list (step S115) and registers the selected extension UI in the management DB 11 (Step S116).

When determining that the template is used (step S114: Yes), the UI registration unit 12 selects a template from the limited list (step S117) and retrieves the extension UI information from the selected template and registers the information in the management DB 11 (step S118). Then, the UI registration unit 12 retrieves operation setting from the same template and reflects the operation setting in the operation setting unit 14 (step S119).

Following the step S116 or the step S119, the UI registration unit 12 determines whether or not a required number of extension UIs have been registered (step S1110). When determining that the required number of extension UIs have been registered (step S1110: Yes), the UI registration unit 12 proceeds to a step S1111. When determining that the required number of extension UIs have not been registered (step S1110: No), the UI registration unit 12 returns to the step S114.

In this way, the UI registration unit 12 executes the processing illustrated in FIG. 14 to acquire the basic UI and the extension UI and registers the UIs in the management DB 11.

[Operation Setting Processing]

Figure 15:
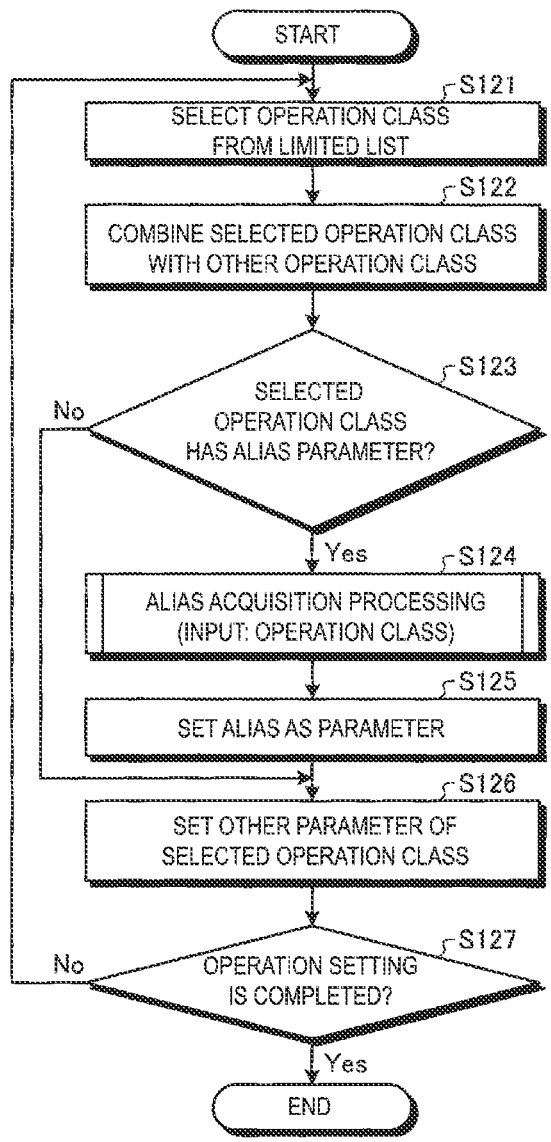
FIG. 15 is a flowchart illustrating an example of a procedure of operation setting processing.

Next, the processing of the operation setting unit 14 is described. FIG. 15 is a flowchart illustrating an example of a procedure of operation setting processing.

As illustrated in FIG. 15, the operation setting unit 14 selects the operation class from the limited operation class list (step S121), and combines the operation class selected as necessary with other operation class already set (step S122). Subsequently, the operation setting unit 14 determines whether or not the selected operation class requires setting of alias as a parameter (step S123).

When determining that the selected operation class does not require setting of alias as a parameter (step S123: No), the operation setting unit 14 sets a parameter other than the alias (step S126). Then, the operation setting unit 14 determines whether or not the operation setting has been completed (step S127). When determining that the operation setting has been completed (step S127: Yes), the operation setting unit 14 terminates the processing. When determining that the operation setting has not been completed (step S127: No), the operation setting unit 14 returns to the step S121.

When determining that the selected operation class requires setting of alias as a parameter (step S123: Yes), the operation setting unit 14 inquiries the alias for the UI management unit 13 by the alias acquisition processing (step S124). At this time, the operation setting unit 14 passes the operation class for setting the alias as an input to the UI management unit 13.

Then, the operation setting unit 14 selects and sets the appropriate UI as the target UI from the alias acquired in the step S124 (step S125), and proceeds to a step S126.

In this way, the operation setting unit 14 executes the processing illustrated in FIG. 15 to set the operation setting of UI extension for the extended system.

[Alias Acquisition Processing]

Figure 16:
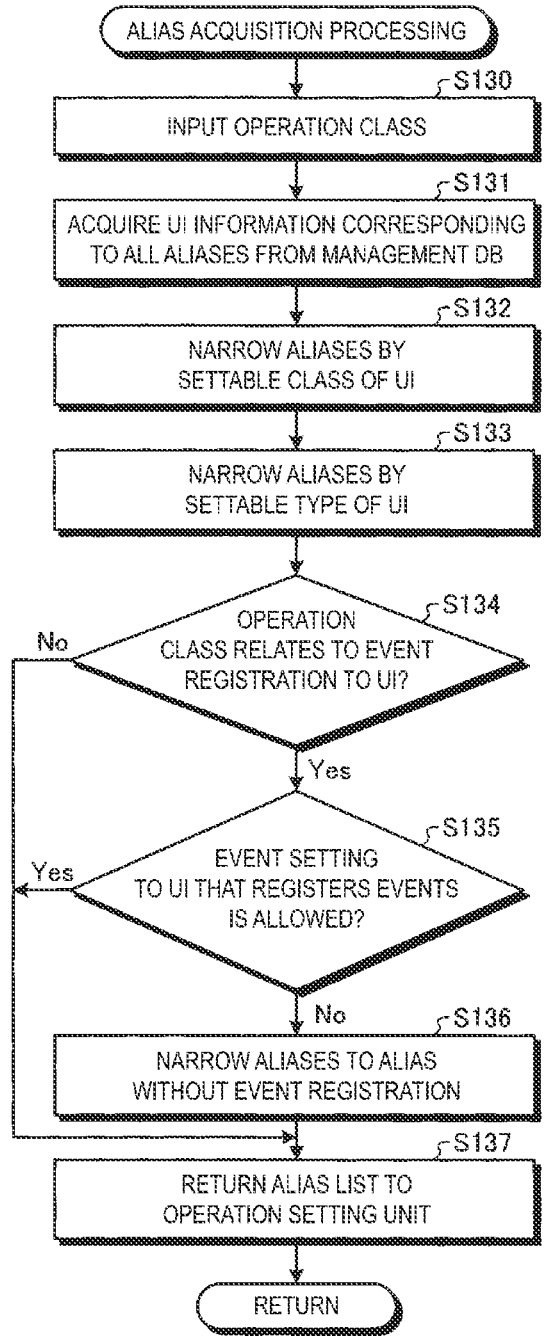
FIG. 16 is a flowchart illustrating a procedure of alias acquisition processing in FIG. 15.

Next, as the alias acquisition processing (step S124) in FIG. 15, an example is described in which the specifiable parameter is limited for the item selected by the setting person. FIG. 16 is a flowchart illustrating a procedure of the alias acquisition processing in FIG. 15.

As illustrated in FIG. 16, the UI management unit 13 receives an input of the operation class passed from the operation setting unit 14 (step S130), and acquires all aliases and UI information of the alias from the management DB 11 (step S131).

The UI management unit 13 narrows aliases by the class of UI that can be set in the current role for the input operation class (step S132). Then, the UI management unit 13 narrows aliases by the type of UI that can be set in the current role for the input operation class (step S133). Then, the UI management unit 13 determines whether or not the operation class relates to event registration in the UI (step S134).

When determining that the operation class does not relate to event registration in the UI (step S134: No), the UI management unit 13 returns the alias list to the operation setting unit 14 (step S137), and terminates the processing.

When determining that the operation class relates to event registration in the UI (step S134: Yes), the UI management unit 13 determines whether or not event setting to the UI that registers events is allowed in the current role (step S135).

When determining that current role is allowed to set the event to the UI with registered event (step S135: Yes), the UI management unit 13 returns the alias list to the operation setting unit 14 (step S137), and terminates the processing. When determining that that current role is not allowed to set the event to the UI with registered event registration (step S135: No), the UI management unit 13 narrows aliases to the alias without event (step S136) and returns the alias list to the operation setting unit 14 (step S137), and terminates the processing.

Limitation Example 1

Figure 17:
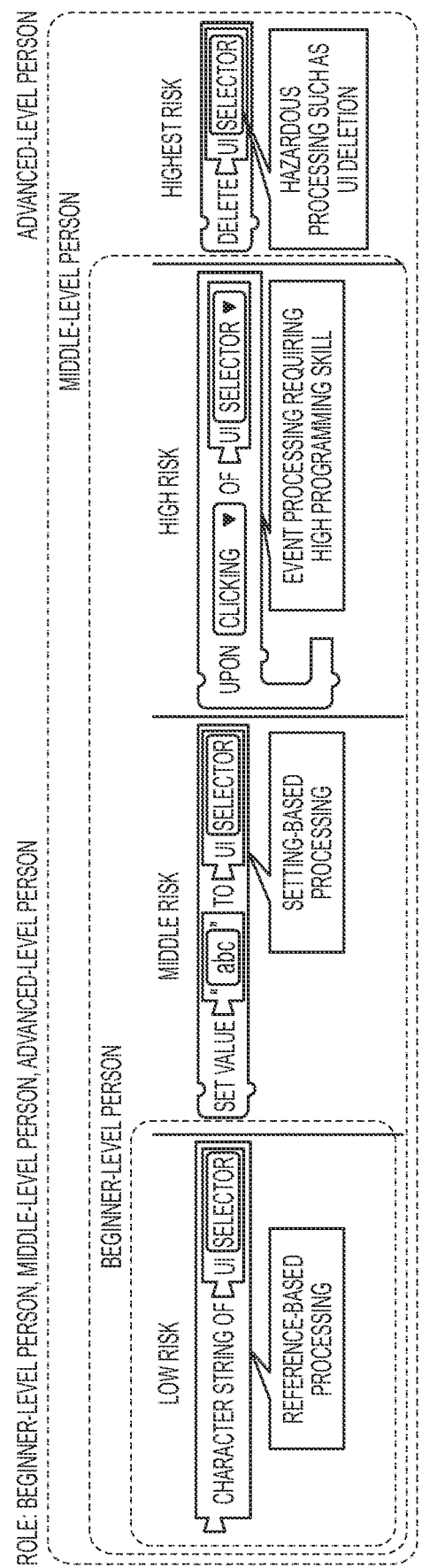
FIG. 17 is a diagram illustrating a limitation example of the extension UI by the setting unit illustrated in FIG. 1.

Next, a limitation example of the extension UI by the setting unit 100 is described. First, with reference to FIG. 17, an example is described in which the role is hierarchically classified into beginner-level person, middle-level person, and advanced-level person. FIG. 17 is a diagram illustrating a limitation example of the extension UI by the setting unit 100 illustrated in FIG. 1.

In this case, in the role of the beginner-level person, reference-based processing is set as settable contents. In the role of the middle-level person, in addition to the processing of the reference system, setting-based processing and event processing are set as settable contents. In the role of the advanced-level person, in addition to the reference-based processing, the setting-based processing, and the event processing, hazardous processing of UI is set as settable contents. In this example, the role is hierarchically classified according to the setting person's skill.

Thus, for the beginner-level person, the extension UI is set to only the low-risk reference-based processing. Also, for the middle-level person, the extension UI is set to the reference-based processing as well as the middle-risk setting processing and the high-risk event processing requiring high programming skill. Also, for the advanced person, the extension UI is set to the highest-risk hazardous processing, such as UI deletion. In this way, according to the setting person's skill, the extension UI can be limited to items (operation class) available to the setting person.

Limitation Example 2

Figure 18:
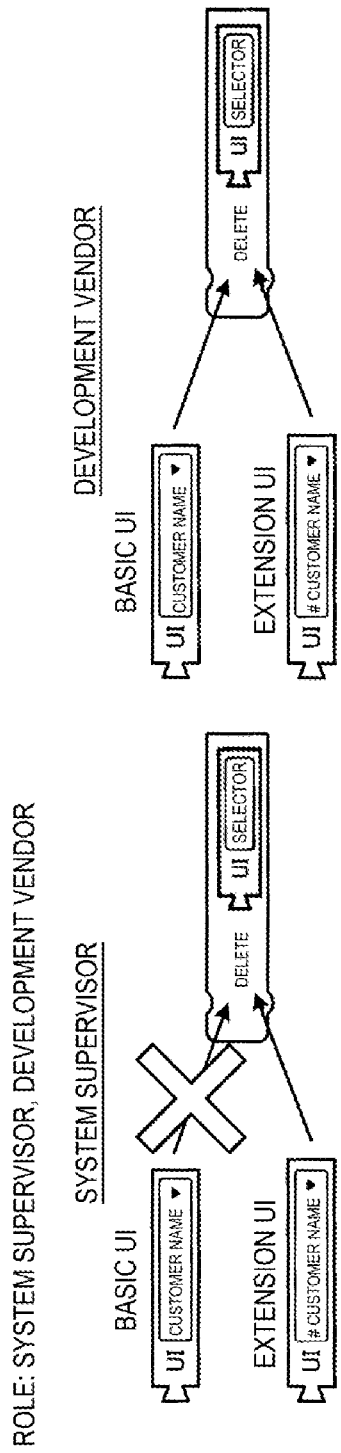
FIG. 18 is a diagram illustrating a limitation example of the extension UI by the setting unit illustrated in FIG. 1.

Referring now to FIG. 18, an example is described in which the role is classified into a system supervisor and a development vendor. FIG. 18 is a diagram illustrating a limitation example of the extension UI by the setting unit 100 illustrated in FIG. 1.

In this case, the role of the system supervisor is not allowed to delete the basic UI, and is allowed to delete the extension UI. The development vendor role is allowed to delete both the basic UI and the extension UI. In this example, the role includes limitation on the operation of the class of UI according to the setting person's authority.

Thus, for the system supervisor, the extension UI indicating the deletion of the basic UI "customer name" itself is not set, and only the deletion of the extension UI "# customer name" (name of any of the customers) is set. In contrast, for the development vendor, the deletion of both the basic UI and the extension UI relating to "Customer Name" can be set. In this way, depending on the operator's authority, the class of UI among parameters (the target UI) that can be specified for the item (operation class) can be limited.

Limitation Example 3

Figure 19:
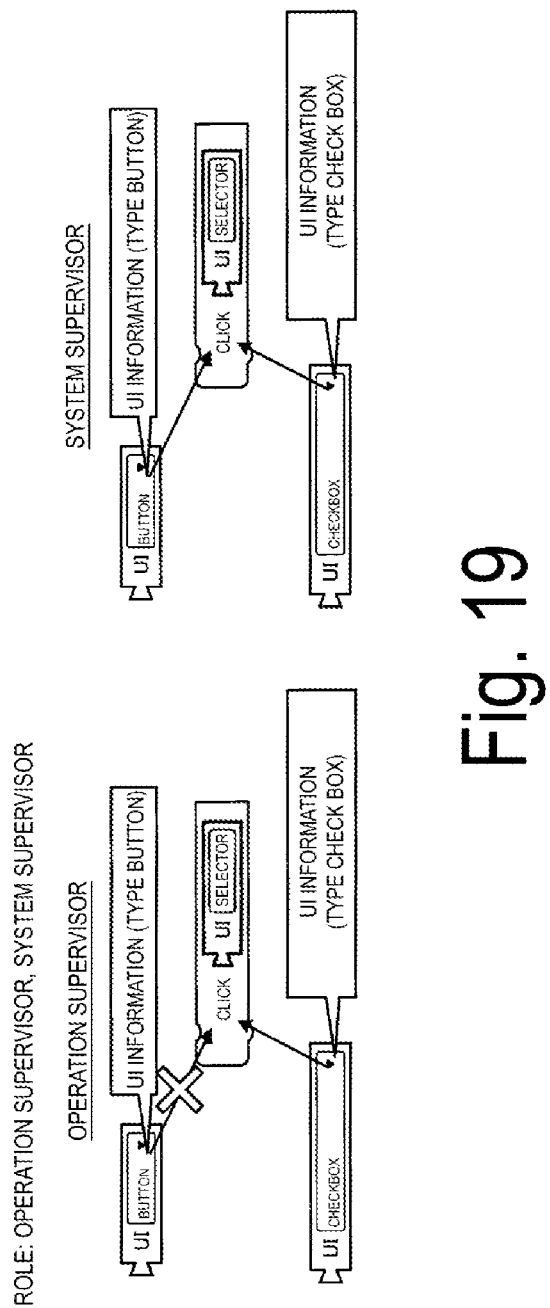
FIG. 19 is a diagram illustrating a limitation example of the extension UI by the setting unit illustrated in FIG. 1.

Next, with reference to FIG. 19, an example is described in which the role is classified into an operation supervisor and the system supervisor. FIG. 19 is a diagram illustrating a limitation example of the extension UI by the setting unit 100 illustrated in FIG. 1.

In this case, for the role of the operation supervisor, setting by clicking the button among the types of extension UI is not allowed and setting by clicking the check box among the types is allowed. For the role of the system supervisor, both the setting by clicking the button and the setting by clicking the check box are allowed. In this example, the role includes limitation on the operation of the type of UI according to the setting person's authority.

Thus, for the operation supervisor, the extension UI relating to the setting by clicking the button is not set, and only the extension UI relating to the setting by clicking the check box is set. In contrast, for the system supervisor, the extension UI relating to both setting by clicking the button and by clicking the check box are set. In this way, according to the operator's authority, the type of UI among parameters (the target UI) that can be specified for the item (operation class) can be limited.

Limitation Example 4

Figure 20:
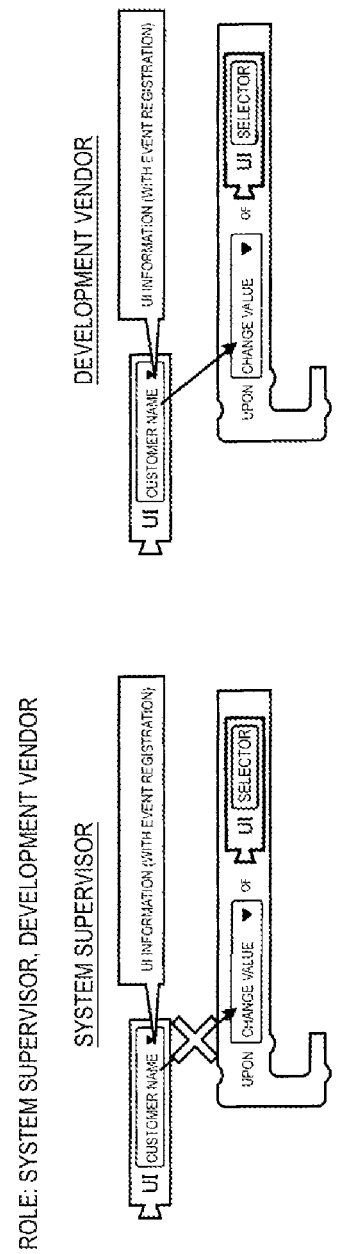
FIG. 20 is a diagram illustrating a limitation example of the extension UI by the setting unit illustrated in FIG. 1.

Referring now to FIG. 20, an example is described in which the role is classified into the system supervisor and the development vendor. FIG. 20 is a diagram illustrating a limitation example of the extension UI by the setting unit 100 illustrated in FIG. 1.

In this case, the role of the system supervisor is not allowed to set an event "change customer name". Also, the role of the development vendor is allowed to set the event "change customer name". In this example, the role includes limitation on the event registered with the UI according to the setting person's authority.

Thus, for the system supervisor, the extension UI relating to the event "change customer name" is not set. In contrast, for the development vendor, the extension UI relating to the event "change customer name" is set. In this way, according to the operator's authority, the event registered with the UI among the parameters (the target UI) can be specified for the item (operation class).

Example 1

Figure 22:
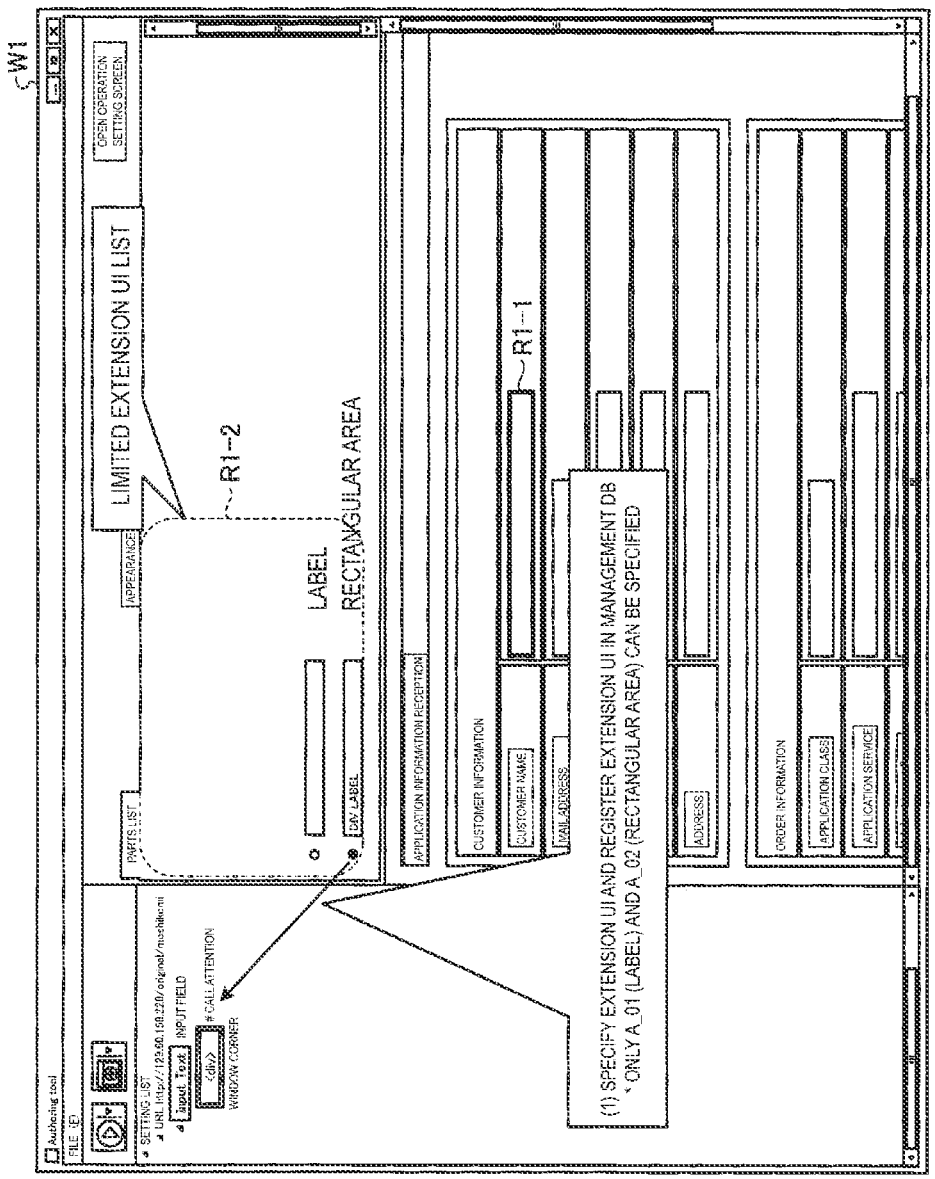
FIG. 22 is a diagram illustrating an example of a GUI setting screen.
Figure 23:
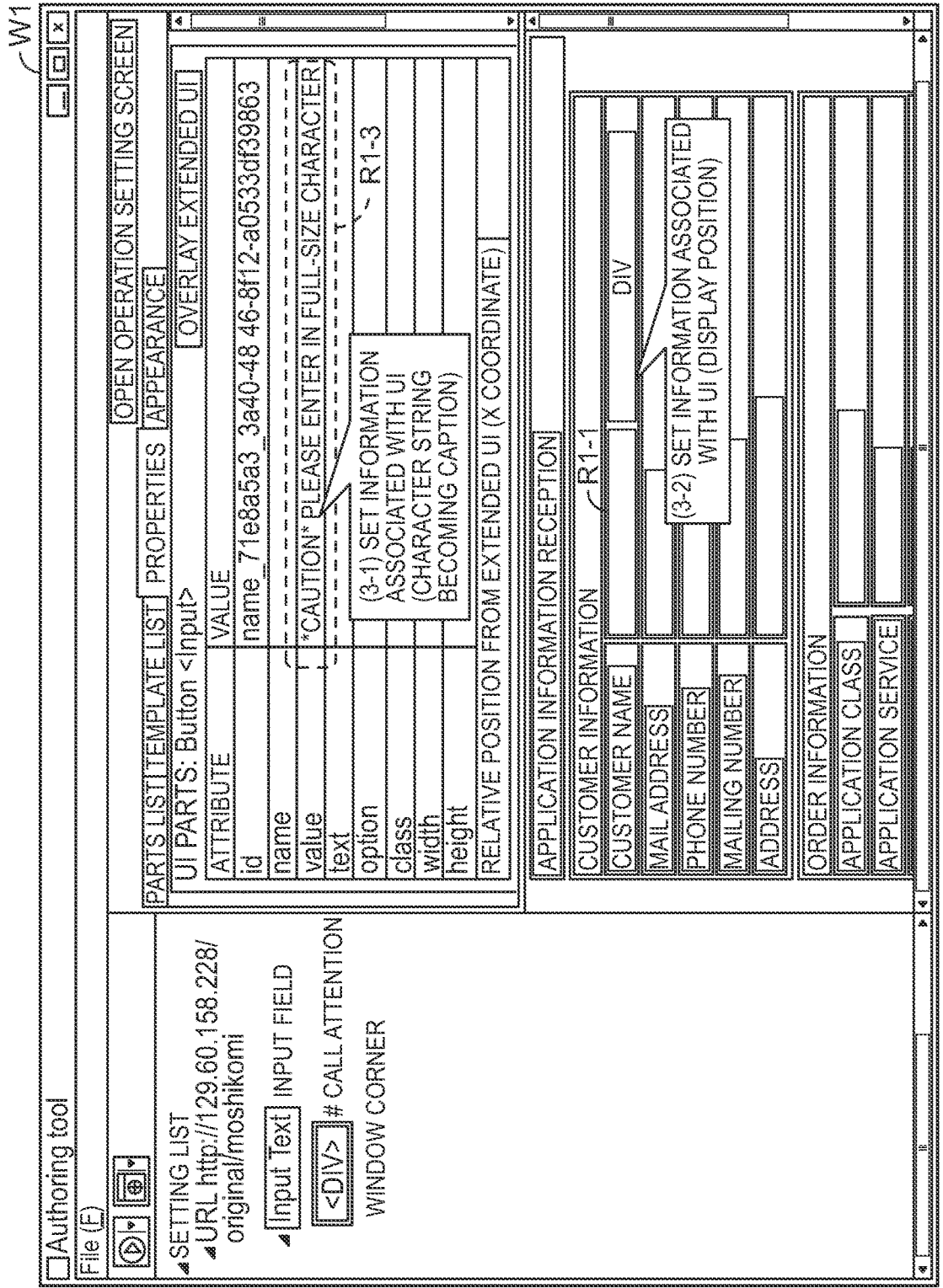
FIG. 23 is a diagram illustrating an example of a GUI setting screen.
Figure 24:
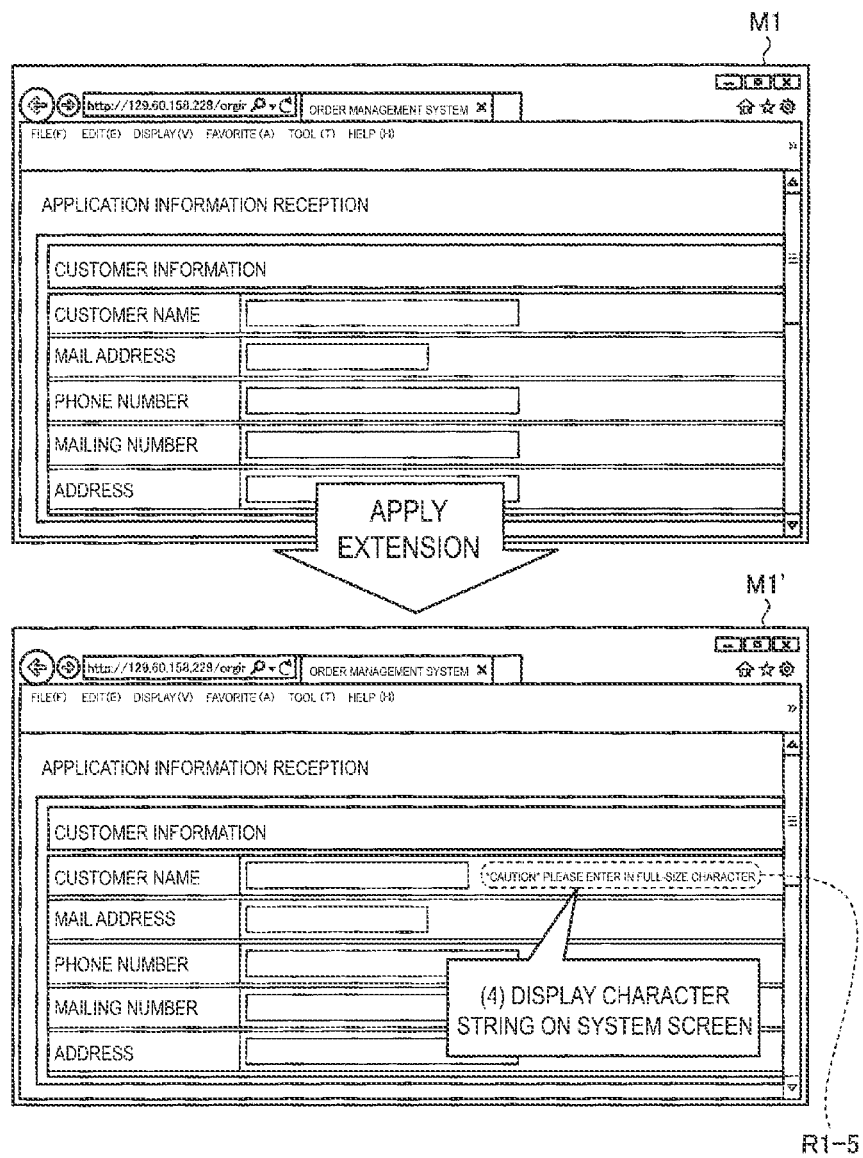
FIG. 24 is a diagram illustrating an example of a menu screen.

Next, Example 1 will be described. In Example 1, an example is described in which the setting unit 100 reads the extension UI list L1, the template list L2, and the operation class list L3 illustrated in FIGS. 11 to 13, and sets the extension UI to a role 1 of setting person illustrated in FIG. 21. For example, Example 1 describes an example in which setting is limited to displaying a character string such as note on an existing system screen. FIG. 21 is a diagram illustrating an example of the role. FIGS. 22 and 23 are diagrams illustrating an example of the GUI setting screen. FIG. 24 is a diagram illustrating an example of the menu screen.

First, the limitation unit 10 reads the information on the role 1 in FIG. 21 by the item list limitation processing (FIG. 10), as well as the extension UI list L1, the template list L2, and the operation class list L3 illustrated in FIGS. 11 to 13, and narrows the selectable items (lists of the extension UI, the template, and combinations of the operation classes) based on the role 1.

Subsequently, the UI registration unit 12 executes the UI registration processing. Here, description is made using a GUI setting screen W1 in FIG. 22. First, the UI registration unit 12 registers "customer name" of the target system as the basic UI.

Then, the UI registration unit 12 registers the extension UI. This registration is limited by the item list limitation processing and thus, the selectable extension UIs are only a label (A_01) and a rectangular area (A_02) set in the role 1 (see FIG. 21) (see a frame R1-2 in FIG. 22 and (1) in FIG.

22). For example, in Example 1, a rectangular area R1-1 corresponding to a customer name field is selected and registered (steps S115, S116 in FIG. 14).

Subsequently, the UI management unit 13 sets information associated with the UI, for example, a character string becoming a caption and display position (see (3-1), (3-2) in FIG. 23). For example, the UI management unit 13 sets the alias and sets, as information relating to the UI, a caution in entering customer name into the caption character string "*caution* please enter in full-size character" (frame R1-3) to the extension UI of the alias "call attention".

Hereinafter, the operation setting unit 14 executes processing, but there is no operation class that can be selected in the role 1 and thus, setting of the UI extension is completed.

By applying this setting to the UI extension, a system screen M1 in FIG. 24 is set to a system screen M1' with the addition of the character string "*caution* please enter in full-size character" (see a frame R1-5). Thus, in Example 1, the extension can be limited to only displaying of the character string on the existing system screen.

In this example, when no person having a skill to describe the operation setting is present, or the operation setting such as automation cannot be created due to the stringent operation policy, settable extension can be limited to addition of the character string to the existing system, thereby applying the extension UI suitable for environment.

Example 2

Figure 26:
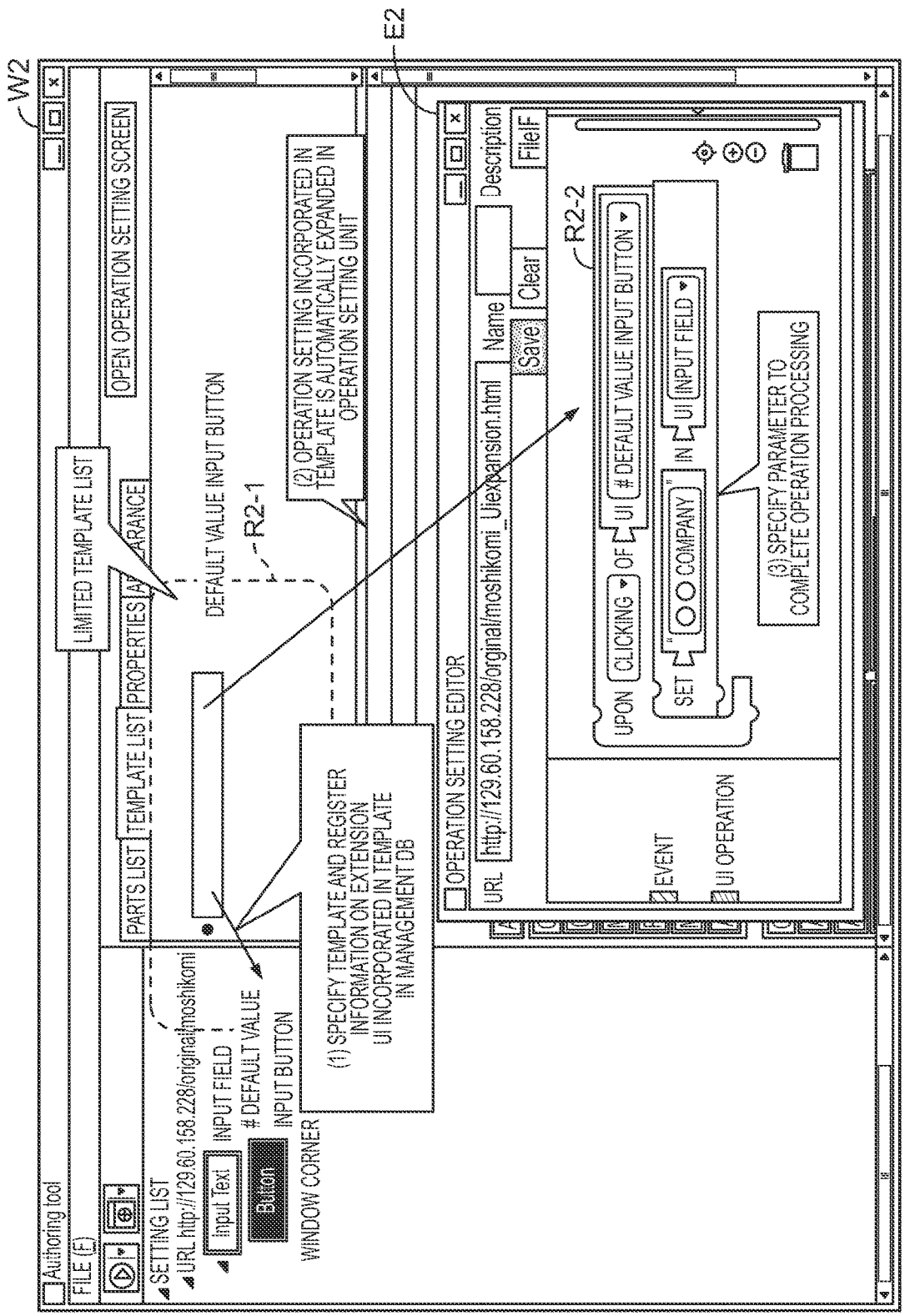
FIG. 26 is a diagram illustrating an example of the GUI setting screen.
Figure 27:
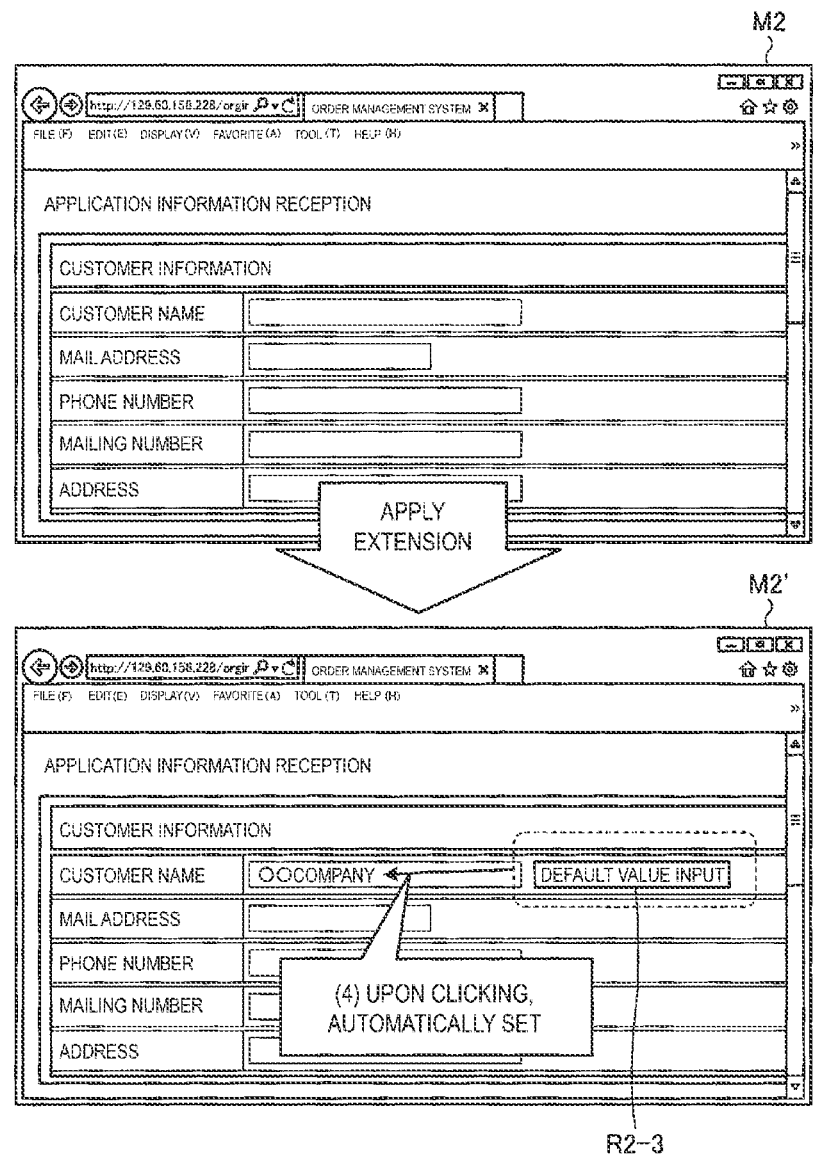
FIG. 27 is a diagram illustrating an example of the menu screen.

Next, Example 2 is described. In Example 2, an example is described in which the setting unit 100 reads the extension UI list L1, the template list L2, and the operation class list L3 illustrated in FIGS. 11 to 13, and sets the extension UI for the setting person of a role 2 illustrated in FIG. 25. For example, in Example 2, the limitation of the extension UI is mitigated such that the extension of a "button that automatically set default value" can be set in addition to the limitation of Example 1. FIG. 25 is a diagram illustrating an example of the role. FIG. 26 is a diagram illustrating an example of the GUI setting screen. FIG. 27 is a diagram illustrating an example of the menu screen.

First, the limitation unit 10 reads the information on the role 2 in FIG. 25 by the item list limitation processing (FIG. 10), reads the extension UI list L1, the template list L2, and the operation class list L3 illustrated in FIGS. 11 to 13, and narrows the selectable items based on the role 2. Next, the UI registration unit 12 executes the registration processing. This procedure is the same as the procedure described with reference to FIG. 22.

Then, the UI template is registered. At this time, because of the limitation by the item list limitation processing (FIG. 10), the selectable template is only a default value input button (T_01) set in the role 2 (see FIG. 25).

In this example, as illustrated in a GUI setting screen W2 in FIG. 26, the UI registration unit 12 specifies a template from a limited template list R2-1 and registers information on the extension UI incorporated into the specified template in the management DB 11 ((1) in FIG. 26). Then, the operational settings incorporated into the template are automatically expanded to the operation setting unit 14 (see (2) in FIG. 26). Specifically, the UI registration unit 12 selects a default value input button from the template list R2-1. Then, the UI registration unit 12 executes the processing in the steps S117 to S119 in FIG. 14 to retrieve information on the extension UI, and registers the information in the management DB 11, as well as to expand an operation setting editor E2 incorporated into the template to the operation setting unit 14.

Then, the operation setting unit 14 specifies the target UI (for example, a material R2-2 in FIG. 26) as a parameter for the expanded operation setting editor E2 to complete the operation setting (see (3) in FIG. 26). At this time, by the parameter limitation processing, only the "# default value input button" can be selected as the parameter (target UI) for the operation class "upon clicking".

This is due to that, in the setting of the role 2 in FIG. 25, for the operation class "B_03" "upon clicking", the settable class is the extension UI and settable type of UI is button. Thus, the UI management unit 13 executes the processing in the steps S131 to S135 and S137 to limit the target UI to only the "# default value input button".

Here, the operation setting unit 14 selects the "# default value input button" as the alias. Similarly, for the operation class of "set to", the parameter (target UI) is also limited and here, the alias in the input field is specified. Next, remaining parameter (here, the character string "00 company" set to the input field) to complete the operation setting.

By applying this setting to the UI extension, a system screen M2 in FIG. 27 is set to a system screen M2' with the addition of a default value input button R2-3. Clicking the default value input button R2-3 automatically sets a default value of "OO company" in customer name (see (4) in FIG. 27).

In this example, the setting person having no skill to combine the operation classes to create the operation setting is allowed to use some templates, such that merely specifying a parameter enables extension such as automation of default value input.

Example 3

Figure 29:
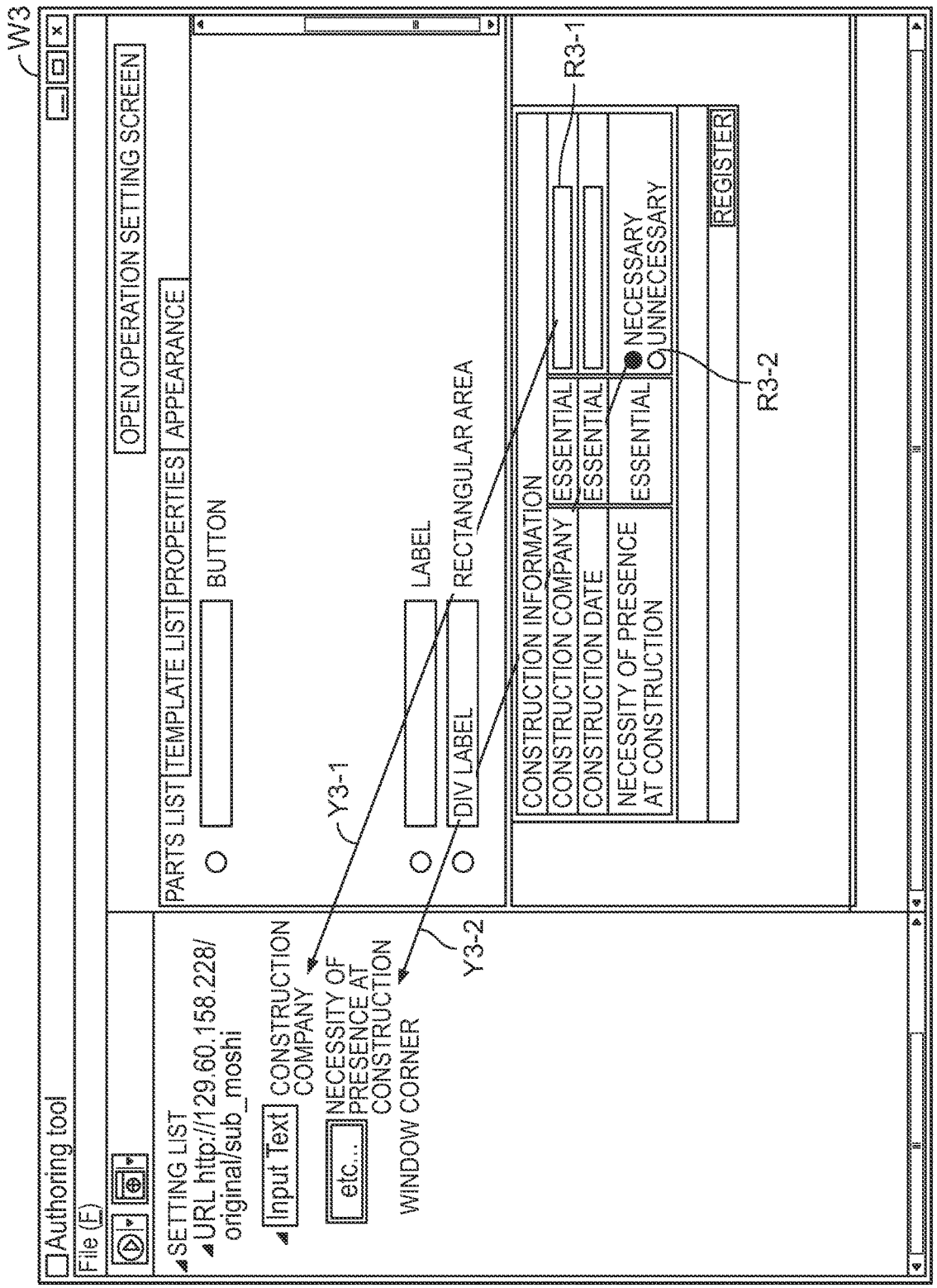
FIG. 29 is a diagram illustrating an example of the GUI setting screen.
Figure 30:
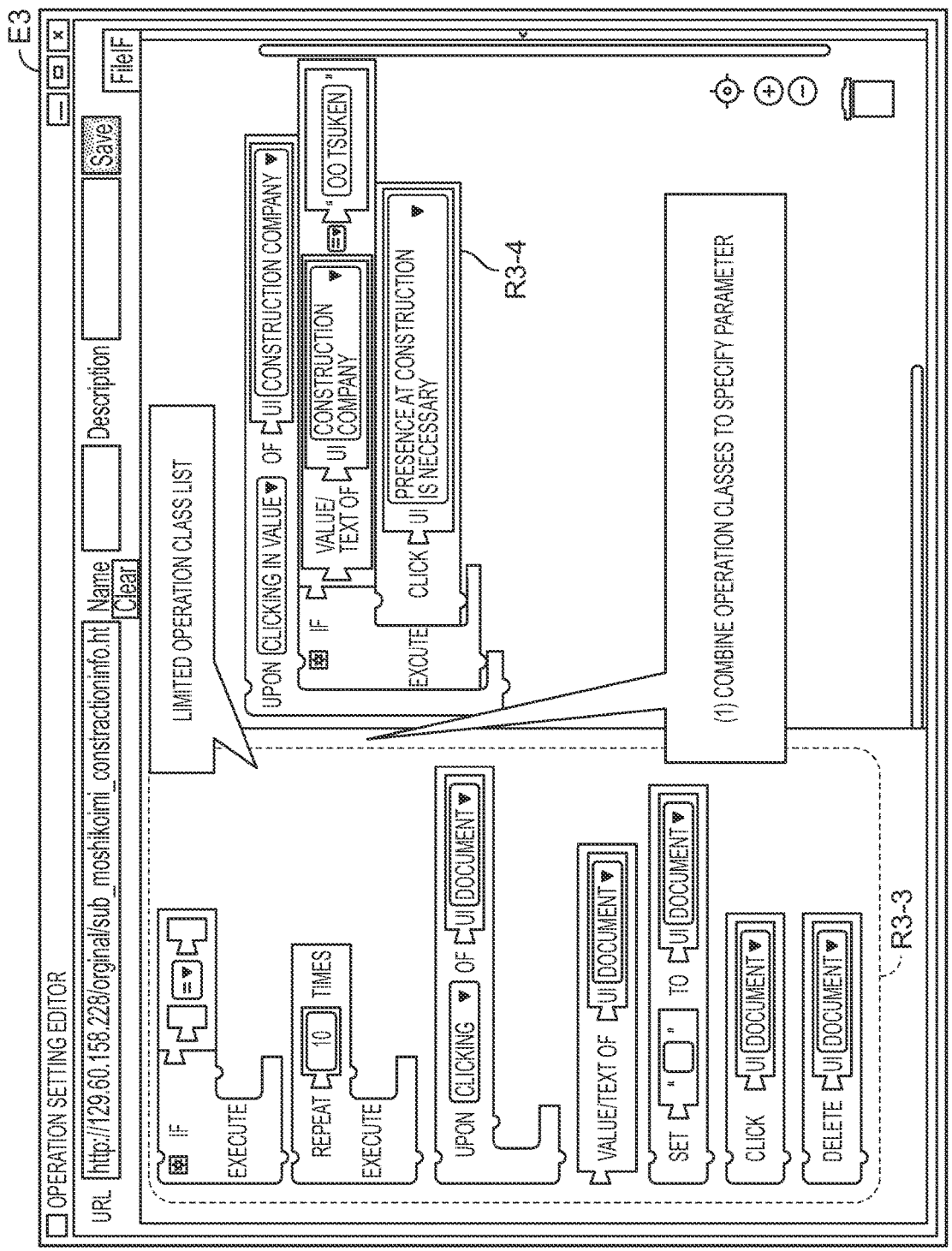
FIG. 30 is a diagram illustrating an example of the GUI setting screen.
Figure 31:
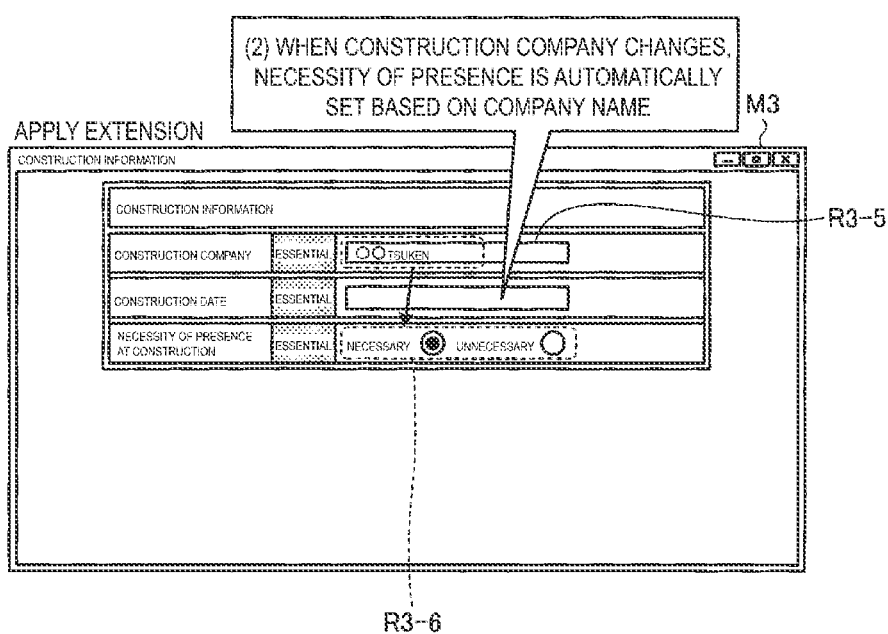
FIG. 31 is a diagram illustrating an example of the menu screen.

Next, Example 3 is described. In Example 3, an example is described in which the setting unit 100 reads the extension UI list L1, the template list L2, and the operation class list L3 illustrated in FIGS. 11 to 13, and sets the extension UI to the setting person of a role 3 illustrated in FIG. 28. For example, in Example 3, a sophisticated example is described in which contents input to the system is determined in response to a value input to the existing system screen, achieving automatic setting. FIG. 28 is a diagram illustrating an example of the role. FIGS. 29 and 30 are diagrams illustrating an example of the GUI setting screen. FIG. 31 is a diagram illustrating an example of a menu screen.

First, the limitation unit 10 reads the information on the role 3 in FIG. 28 by the item list limitation processing (FIG. 10), reads the extension UI list L1, the template list L2, and the operation class list L3 illustrated in FIGS. 11 to 13, and narrows the selectable items based on the role 3.

The UI registration unit 12 executes UI registration processing. For example, a GUI setting screen W3 in FIG. 29 is described as an example. First, the UI registration unit 12 registers "construction company" (field R3-1) and "necessity of presence at construction" (field R3-2) of the target system as the basic UI (see arrows Y3-1, Y3-2 in FIG. 29). In this example, there is no extension UI added to the system screen and the operating setting is created using only the basic UI.

In the role 3, the operation classes other than the operation class (B_07) for deleting high-risk UI can be selected. In an operation setting editor E3 illustrated in FIG. 30, the operation setting unit 14 combines these operation classes to specify parameters, and creates the operation setting (see (1) in FIG. 30).

For example, the operation setting unit 14 can combine operation classes requiring high skill such as the operation class of branch condition from an operation class list R3-3 and click "presence at construction is necessary" only when "construction company" is "OO TSUKEN" (a material R3-4 in FIG. 30). In addition, in the role 3, although the operation class "click" can be selected, the parameter (target UI) that can be specified for the operation class is limited to the class other than button by the parameter limitation processing and thus, setting of automatically pressing the button of the existing system cannot be created.

When the construction company is changed by the UI extension to this setting is applied as illustrated on the system screen M3 in FIG. 31, the necessity of presence at construction can be automatically set based on the company name (see (2) in FIG. 31). Specifically, when "OO TSUKEN" is entered in a construction company field R3-5, the necessity of presence at construction is automatically determined and "necessary" is clicked (see an area R3-6). This can reduce operator decisions and reduce input operation.

In this example, dangerous settings, operating settings with reduced efforts can be created while limiting clicking of the button in the existing system and hazardous setting such as deletion of UI.

Example 4

Figure 33:
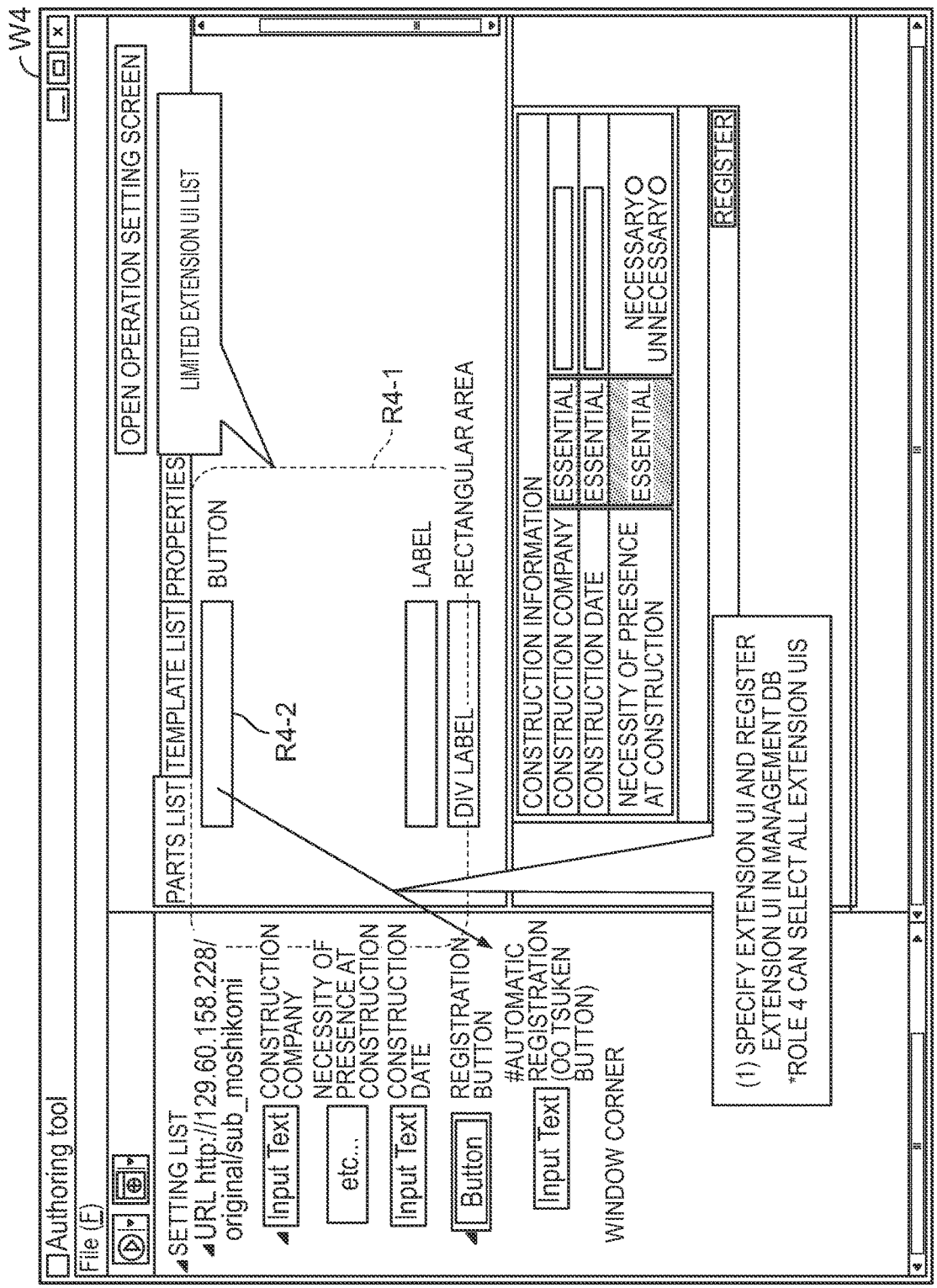
FIG. 33 is a diagram illustrating an example of the GUI setting screen.
Figure 34:
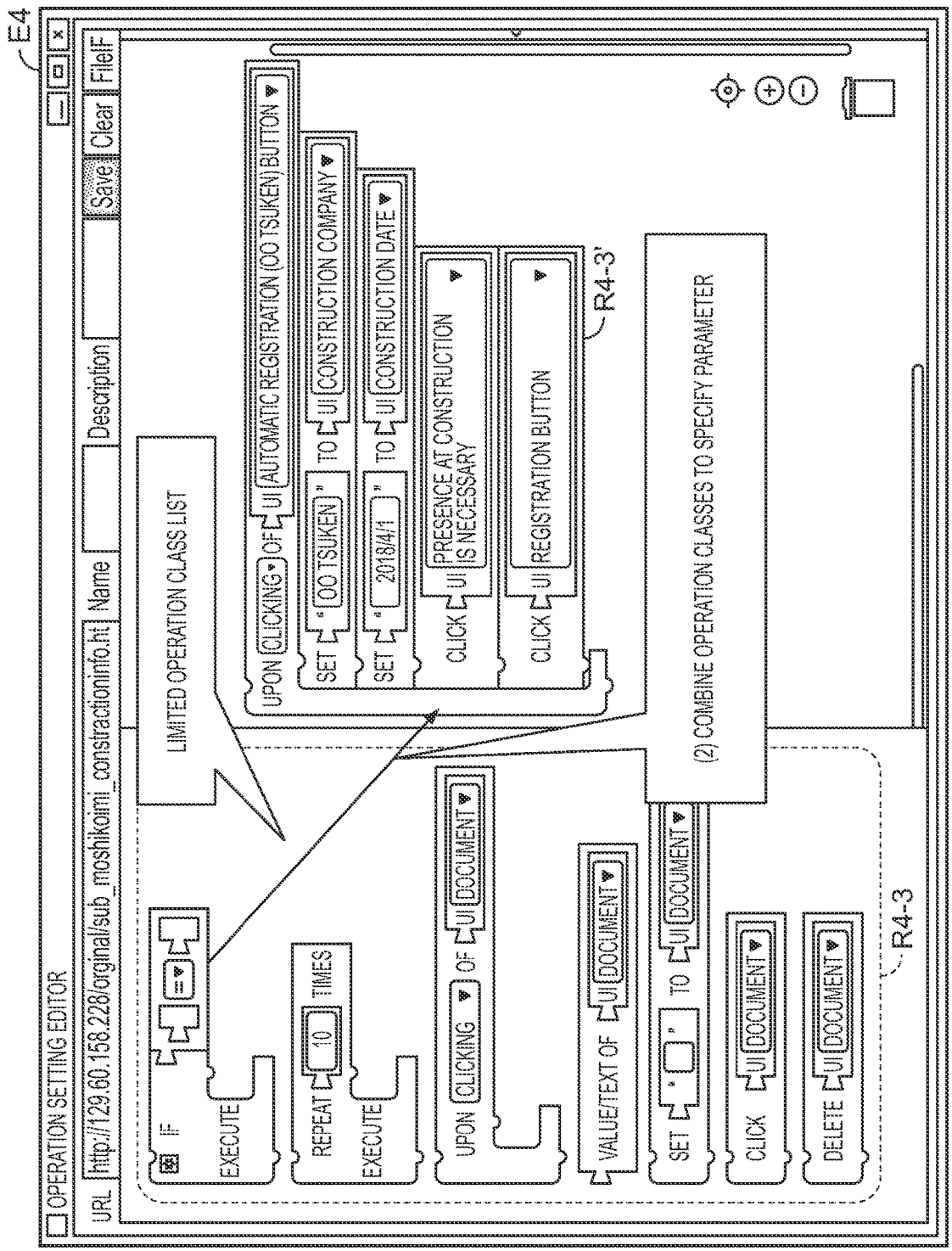
FIG. 34 is a diagram illustrating an example of the GUI setting screen.
Figure 35:
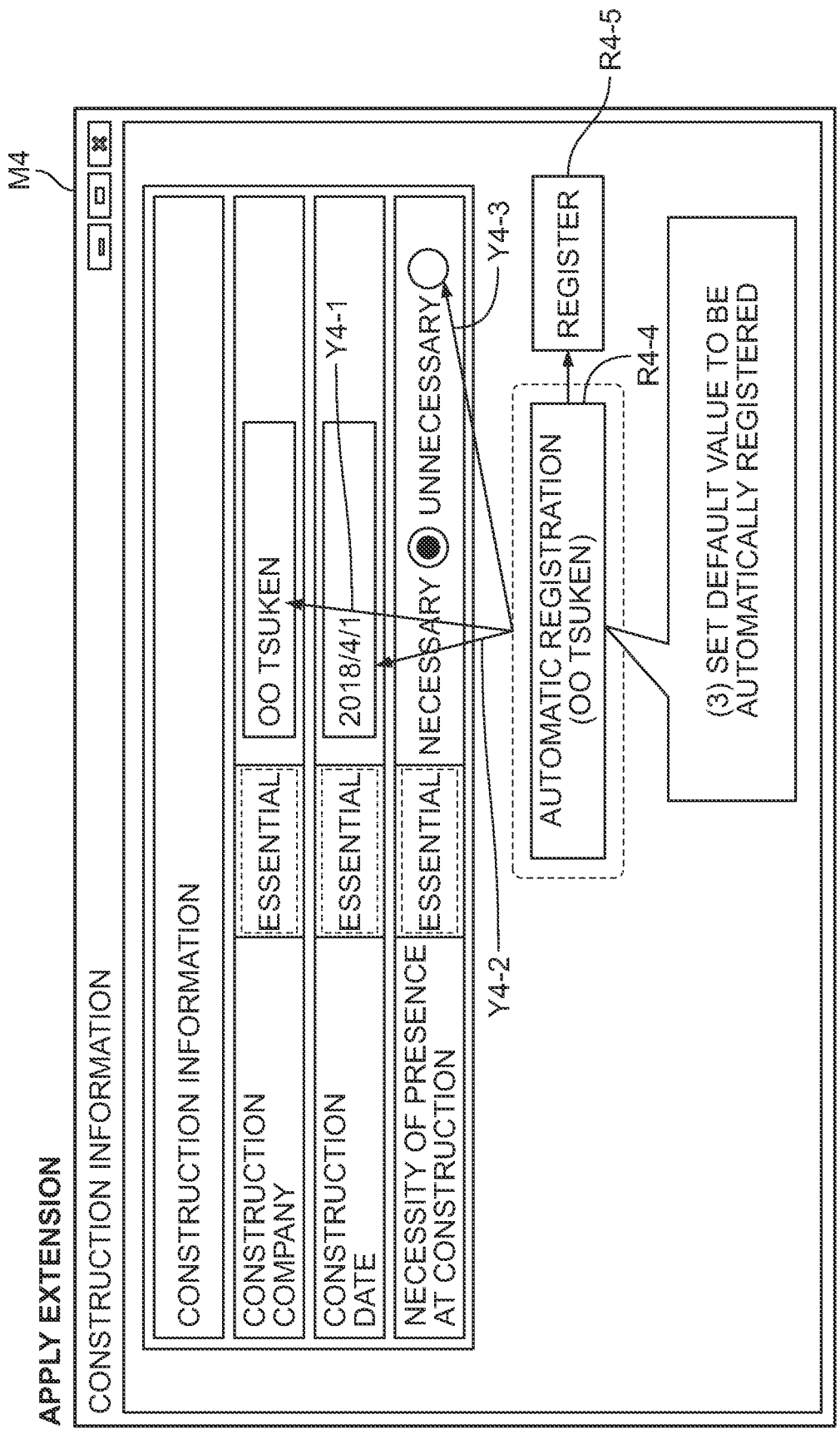
FIG. 35 is a diagram illustrating an example of the menu screen.

Next, Example 4 is described. In Example 4, an example is described in which the setting unit 100 reads the extension UI list L1, the template list L2, and the operation class list L3 illustrated in FIGS. 11 to 13, and sets the extension UI to the setting person of a role 4 illustrated in FIG. 32. For example, in Example 4, an example is described in which limitation of the extension UI is largely mitigated to complete automatic registration. FIG. 32 is a diagram illustrating an example of the role. FIGS. 33 and 34 are diagrams illustrating an example of the GUI setting screen. FIG. 35 is a diagram illustrating an example of the menu screen.

First, the limitation unit 10 reads the information on the role 4 in FIG. 32 by the item list limitation processing (FIG. 10), reads the extension UI list L1, the template list L2, and the operation class list L3 illustrated in FIGS. 11 to 13, and narrows the selectable items based on the role 4.

The UI registration unit 12 then executes UI registration processing. For example, description is made using a GUI setting screen W4 in FIG. 33. First, the UI registration unit 12 registers the "construction company", "necessity of presence at construction", "construction date," and "registration button" of the extended system as the basic UI.

Then, the UI registration unit 12 registers the extension UI. Here, in the role 4, all extension UIs can be selected. In Example 4, a button R4-2 is selected as the extension UI from among an extension UI list R4-1 to register the extension UI in the management DB 11 (see (1) in FIG. 33) and sets the alias "# automatic registration (OO TSUKEN) button".

Subsequently, with reference to an operation setting editor E4 in FIG. 34, the creation of operation setting by the operation setting unit 14 will be described. In the role 4, all operation classes can be selected. The operation setting unit 14 combines operation classes indicated in an operation class list R4-3 to specify a parameter by (see (2) in FIG. 34).

Specifically, the operation setting unit 14 combines the operation classes to create operation setting that, when the "# automatic registration (OO TSUKEN) button" is clicked, "OO TSUKEN" is set to "construction company", "2018/4/1" is set to "construction date", "presence at construction is necessary" is clicked, and "registration button" is clicked (material R4-3'). Such UI setting can be applied to automate processing from input to registration of a default value. In the role 3 in Example 3, aliases such as the basic UI and the type of UI of button cannot be specified due to the parameter limitation processing in the operation class "click". In contrast, in the role 4, the parameter limitation is mitigated such that the operating setting of pressing the button (registration button) of the basic UI can be created.

By applying this setting to the UI extension, as illustrated on a system screen M4 in FIG. 35, setting a default value enables automatic registration (see (3) in FIG. 35). Specifically, when a "automatic registration (OO TSUKEN)" button R4-4 added to system screen M4 is clicked, necessary information is automatically input (see arrows Y4-1 to Y4-3) to complete registration R4-5.

In this example, since the setting of adding a frequently-input pattern as the automatic registration button to automate the registration processing is allowed, input to the system can be completed with one click, achieving the extension with largely-reduced operation efforts.

Effects of Embodiment

As described above, the setting unit 100 in accordance with the present embodiment limits the list of extension UI items to be added to the existing Web system, which can be selected by the setting person, according to the role of the setting person including affiliated post, skill, or authority of the setting person, and the UI information. Furthermore, the setting unit 100 sets the extension UI in which the parameter specifiable for the item selected by the setting person is limited according to the role of the setting person and the UI information.

Thus, in accordance with the present embodiment, the extension UI is set based on the setting person's role and the UI information and thus, limitation such as what extension can or cannot be set to what UI may be made according to the UI information.

Here, the UI information is the class of UI indicating the basic UI or the extension UI, the type of UI, and the event registered with the UI, and when specifying the operation setting target UI as the parameter of the operation class, the setting unit 100 limits the specifiable UI according to the type of the operation class in addition to the setting person's role and the UI information.

Thus, in this embodiment, the extension UI, in which the specifiable parameter is limited according to the class of UI, the type of UI, the event, the type of operation class, is set. As a result, according to the present embodiment, the UI setting limited to be suitable for the environment using the UI extension technology can be created and used even in situations under rigid constraints in terms of operation and security, enabling expansion of application.

As described above, the setting unit 100 in accordance with the present embodiment can limit setting of the UI extension as desired and thus, can suitably limit setting of the UI extension in a range to be constrained.

System Configuration and the Like

The components of each device illustrated in the drawing are functional and conceptual components and are not necessarily physically configured as illustrated in the drawing. That is, specific configurations of dispersion and integration of the devices are not limited to those illustrated in the drawing, and all or some of them can be configured to be functionally or physically dispersed and integrated in any granularity in accordance with various loads, usage conditions, and the like. Further, all or some of processing functions performed by the devices may be realized by a CPU and a program analyzed and executed by the CPU, or may be realized as hardware by wired logic. The control apparatus 1 according to the present embodiment can also be realized by a computer and a program, and the program can be recorded in a recording medium and provide a program through a network.

Further, all or some of the processes described as being automatically performed, among the processes described in the present embodiment, can also be manually performed, or all or some of the processes described as being manually performed can also be automatically performed by a known method. In addition, information including the processing procedures, the control procedures, the specific names, and various data and parameters described in the above-described document and drawings can be arbitrarily changed except for the case of special description.

Program

Figure 36:
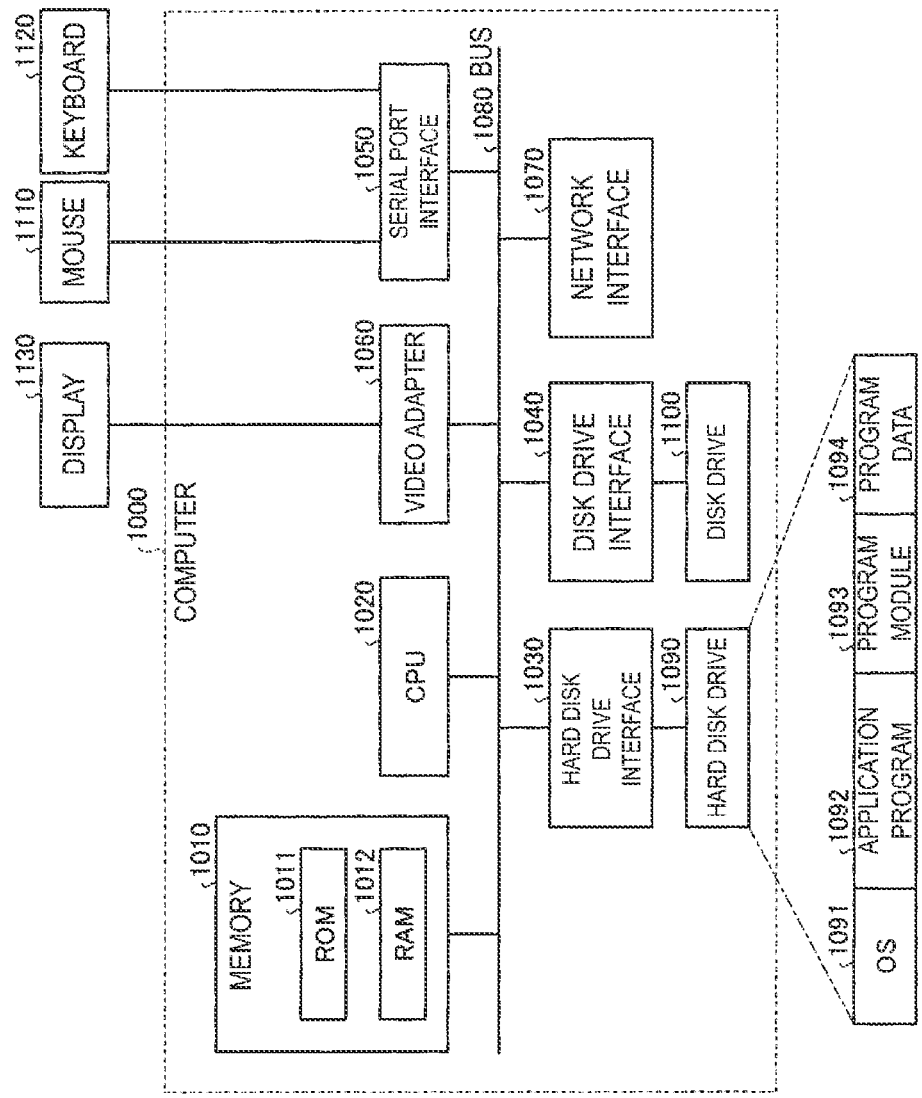
FIG. 36 is a diagram illustrating an example of a computer in which a control apparatus is realized by executing a program.
Figure 37:
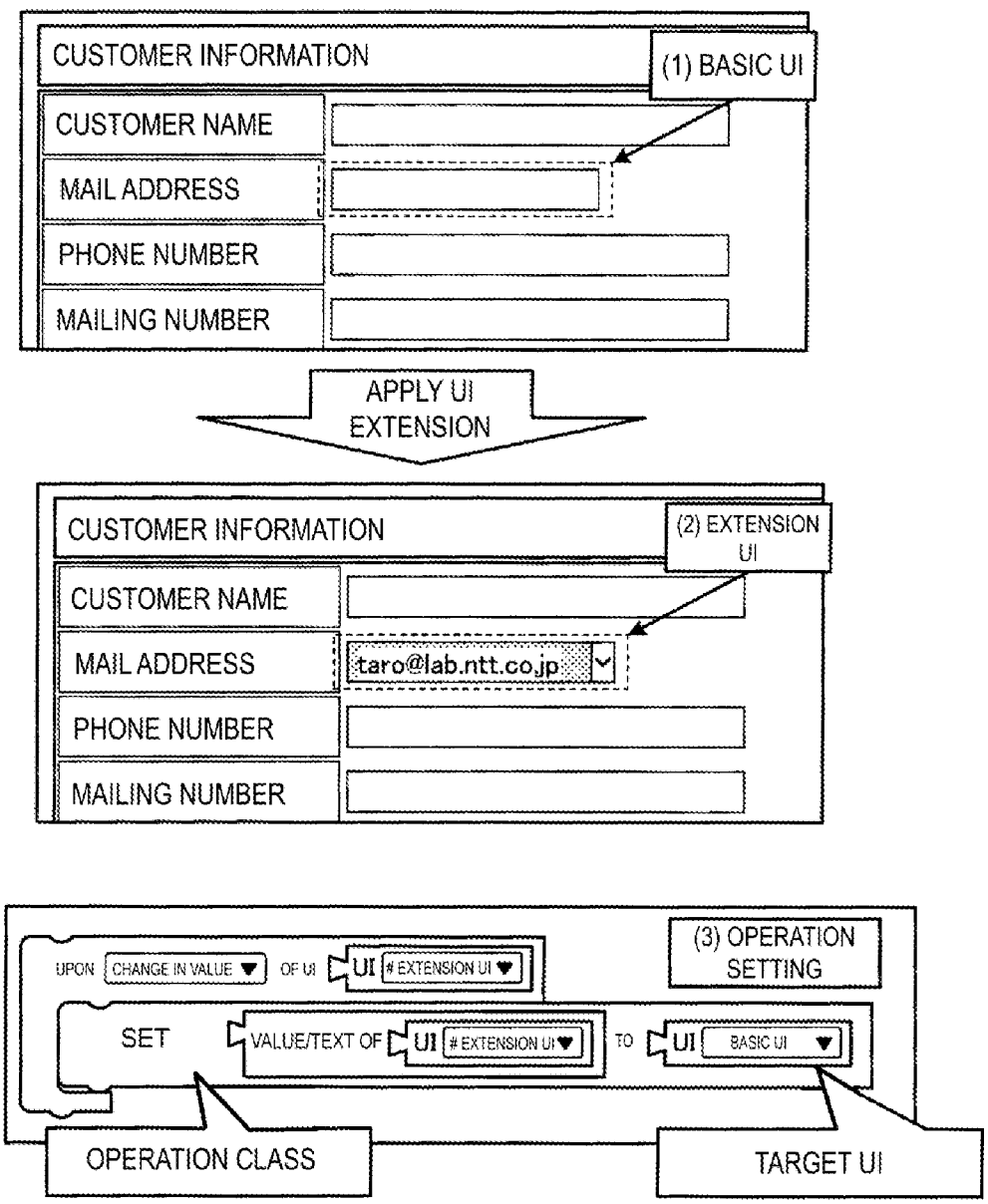
FIG. 37 is a diagram illustrating a related example in which UI extension is applied.
Figure 38:
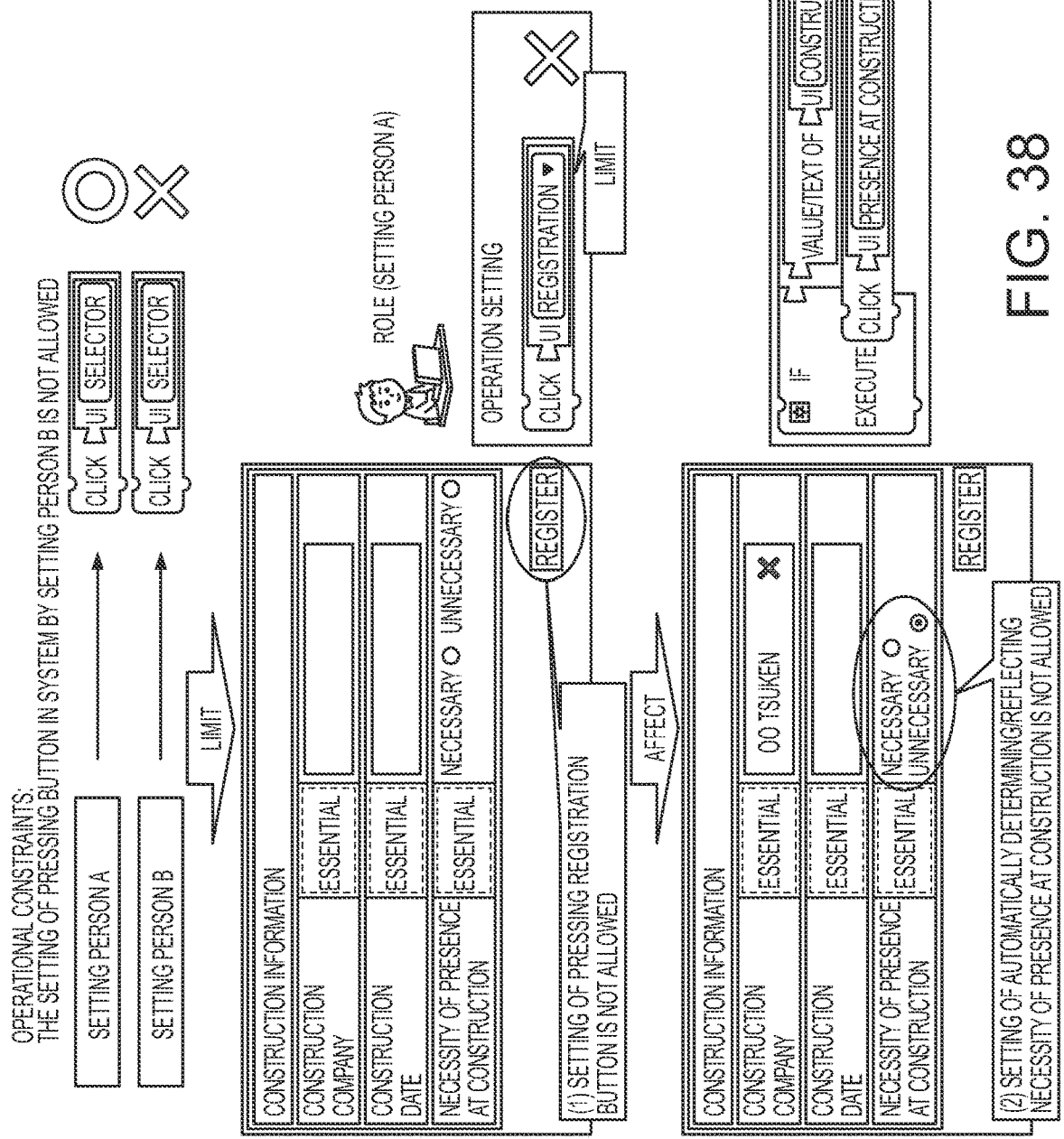
FIG. 38 is a diagram for describing problems of the related art.

FIG. 36 is a diagram illustrating an example of a computer for realizing the control apparatus 1 by executing a program. A computer 1000 includes, for example, a memory 1010 and a CPU 1020. In addition, the computer 1000 includes a hard disk drive interface 1030, a disk drive interface 1040, a serial port interface 1050, a video adapter 1060, and a network interface 1070. These units are connected by a bus 1080.

The memory 1010 includes a ROM 1011 and a RAM 1012. The ROM 1011 stores a boot program, such as Basic Input Output System (BIOS), for example. The hard disk drive interface 1030 is connected to a hard disk drive 1090. The disk drive interface 1040 is connected to a disk drive 1100. A detachable storage medium such as a magnetic disk or an optical disc is inserted into the disk drive 1100. The serial port interface 1050 is connected to, for example, a mouse 1110 and a keyboard 1120. A video adapter 1060 is connected to, for example, a display 1130.

Here, the hard disk drive 1090 stores, for example, an OS 1091, an application program 1092, a program module 1093, and program data 1094. That is, the program defining each process of the control apparatus 1 is implemented as the program module 1093 in which codes executable by the computer 1000 are described. The program module 1093 is stored in, for example, the hard disk drive 1090. For example, the program module 1093 for executing processing similar to the functional configuration in the control apparatus 1 is stored in hard disk drive 1090. Note that the hard disk drive 1090 may be replaced with a solid state drive (SSD).

In addition, setting data used in the processing of the above-described embodiment is stored in, for example, the memory 1010 or the hard disk drive 1090, as the program data 1094. In addition, the CPU 1020 reads the program module 1093 and the program data 1094 stored in the memory 1010 and the hard disk drive 1090 to the RAM 1012 and executes them as necessary.

Note that the program module 1093 and the program data 1094 are not limited to being stored in the hard disk drive 1090, and may be stored, for example, in a removable storage medium, and read by the CPU 1020 via a disk drive 1100 or its equivalent. Alternatively, the program module 1093 and the program data 1094 may be stored in other computers connected via a network (a Local Area Network (LAN), and a Wide Area Network (WAN)). In addition, the program module 1093 and the program data 1094 may be read by the CPU 1020 from another computer through the network interface 1070.

Although the embodiment to which the invention made by the present inventors is applied have been described above, the invention is not limited by the description and the drawings as a part of the disclosure of the present invention based on the embodiment. In other words, all of other embodiments, examples, operation technologies, and the like made by those skilled in the art on the basis of the embodiment are within the scope of the invention.

REFERENCE SIGNS LIST

1 Control apparatus
2 Input apparatus
3 Output apparatus
4 OS
5 Extended system
6 Storage unit
10 Limitation unit
11 Management DB
12 UI registration unit
13 UI management unit
14 Operation setting unit
100 Setting unit

The invention claimed is:

1. A setting apparatus comprising:
a limitation unit comprising one or more processors configured to limit a list of extension user interface items to be added to an existing Web system, the list of extension user interface items being selectable by a setting person, according to a role of the setting person including an affiliated post, skill, or authority of the setting person and user interface information, wherein the limitation unit is configured to limit, according to the role of the setting person, a list of operation classes that is used to set one or more user operations on one or more items of the list of extension user interface items; and
a setting unit comprising the one or more processors or another processor configured to set an extension user interface in which a parameter specifiable for an extension user interface item selected by the setting person from the list of extension user interface items is limited according to the role of the setting person and the user interface information,
wherein the setting unit is configured to: (1) select one or more operation classes from the list of operation classes; (2) determine whether the one or more selected operation classes require setting a user interface as a parameter or not; and (3) in response to determining that setting the user interface as the parameter is required, specify a target user interface as the parameter of the one or more selected operation classes,
wherein the target user interface is selected from a list of user interfaces narrowed according to the one or more operation classes in addition to the role of the setting person, and
wherein the role of the setting person is determined by combining a plurality of roles, and wherein two roles among the plurality of roles are selected from different categories of roles.

2. The setting apparatus according to claim 1, wherein the user interface information is a class of a user interface, the class indicating that the user interface is i) a basic user interface pre-existing in the existing Web system or the extension user interface, ii) a type of the user interface, and iii) an event registered with the user interface.

3. The setting apparatus according to claim 1, wherein the limitation unit is configured to limit, according to the role of the setting person:
a list of types of the extension user interface.

4. The setting apparatus according to claim 1, wherein one of the two roles is selected from a first category from the affiliated post, the skill, and the authority of the setting person, and wherein another one of the two roles is selected from a second category from the affiliated post, the skill, and the authority of the setting person different from the first category.

5. The setting apparatus of claim 1 wherein the one or more user operations comprise a combination of operations on one type of the extension user interface.

6. The setting apparatus of claim 1 wherein the one or more operation classes comprise a plurality of operation classes.

7. A setting method performed by a setting apparatus, the method comprising:
limiting a list of extension user interface items to be added to an existing Web system, the list of extension user interface items being selectable by a setting person, according to a role of the setting person including an affiliated post, skill, or authority of the setting person and user interface information;
limiting, according to the role of the setting person, a list of operation classes that is used to set one or more user operations on one or more items of the list of extension user interface items; and
setting an extension user interface in which a parameter specifiable for an extension user interface item selected by the setting person from the list of extension user interface items is limited according to the role of the setting person and the user interface information, comprising:
selecting one or more operation classes from the list of operation classes;
determining whether the one or more selected operation classes require setting a user interface as a parameter or not; and
in response to determining that setting the user interface as the parameter is required, specify a target user interface as the parameter of the one or more selected operation classes, wherein the target user interface is selected from a list of user interfaces narrowed according to the one or more operation classes in addition to the role of the setting person, and
wherein the role of the setting person is determined by combining a plurality of roles, and wherein two roles among the plurality of roles are selected from different categories of roles.

8. A setting program recorded in a non-transitory recording medium for causing a computer to execute:
limiting a list of extension user interface items to be added to an existing Web system, the list of extension user interface items being selectable by a setting person, according to a role of the setting person including an affiliated post, skill, or authority of the setting person and user interface information;
limiting, according to the role of the setting person, a list of operation classes that is used to set one or more user operations on one or more items of the list of extension user interface items; and
setting an extension user interface in which a parameter specifiable for an extension user interface item selected by the setting person from the list of extension user interface items is limited according to the role of the setting person and the user interface information, comprising:
selecting one or more operation classes from the list of operation classes;
determining whether the one or more selected operation classes require setting a user interface as a parameter or not; and
in response to determining that setting the user interface as the parameter is required, specify a target user interface as the parameter of the one or more selected operation classes, wherein the target user interface is selected from a list of user interfaces narrowed according to the one or more operation classes in addition to the role of the setting person, and
wherein the role of the setting person is determined by combining a plurality of roles, and wherein two roles among the plurality of roles are selected from different categories of roles.

* * * * *